(12) United States Patent  
Iwasa

(10) Patent No.: US 6,811,331 B2  
(45) Date of Patent: Nov. 2, 2004

(54) LENS SHUTTER SYSTEM

(75) Inventor: Kazuyuki Iwasa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/455,233

(22) Filed: Jun. 5, 2003

(65) Prior Publication Data

US 2004/0042785 A1 Mar. 4, 2004

(30) Foreign Application Priority Data

Jun. 12, 2002 (JP) .......................................... 2002-171622  
Aug. 6, 2002 (JP) .......................................... 2002-229058  
Aug. 22, 2002 (JP) .......................................... 2002-242251

(51) Int. Cl.[7] ................................................. G03B 9/22  
(52) U.S. Cl. ...................................... 396/500; 396/449  
(58) Field of Search ................................ 396/493–501, 396/505, 508, 510, 466, 467, 449, 451, 469

(56) References Cited

U.S. PATENT DOCUMENTS 5,594,519 A * 1/1997 Shimizu ..................... 396/449

6,749,349 B2 * 6/2004 Tanaka ........................ 396/454

FOREIGN PATENT DOCUMENTS

| JP | 45-26780 | 10/1970 |
| JP | 4-44253 | 5/1983 |
| JP | 06-043520 | 2/1994 |
| JP | 11-326985 | 11/1999 |
| JP | 2001-311908 | 11/2001 |

* cited by examiner

*Primary Examiner*—W.B. Perkey  
(74) *Attorney, Agent, or Firm*—John C. Pokotylo; Straub & Pokotylo

(57) ABSTRACT

A lens shutter system has an inner drive ring which is rotated by a drive motor and an outer drive ring which is rotated by the drive motor. A plurality of shutter blades of the lens shutter system are driven through drive pins of the inner drive ring and drive pins of the outer drive ring so as to be opened and closed or are rotatably supported by the respective pins of the rings. Upon shutter opening, only the inner drive ring is driven clockwise to open the shutter blades. Upon shutter closing, only the outer drive ring is similarly driven clockwise to close the shutter blades. As mentioned above, upon switching between shutter opening mode and shutter closing mode, the direction of rotation of the inner and outer drive rings is not changed. Thus, the shutter operation can be performed at high speed.

7 Claims, 30 Drawing Sheets

LENS SHUTTER SYSTEM

This application claims benefit of Japanese Applications No. 2002-229058 filed in Japan on Aug. 6, 2002, No. 2002-171622 filed in Japan on June 12, No. 2002-242251 filed in Japan on Aug. 22, 2002, the contents of which are incorporated by this reference.

BACKGROUND OF THE INVENTION

1. Field of the Invention

The present invention relates to the structure of a lens shutter, a macro-lens adapter, a camera capable of mounting a macro-lens adapter, and a camera having a negative LCD in front of a taking lens.

2. Related Art Statement

In conventional lens shutters each using a set of sectors driven so as to open and close, in order to open and close the shutter, it is necessary to move the sectors once so as to open and then immediately reverse them so as to close.

In order to realize high-speed operation in the above-mentioned conventional lens shutter, Japanese Examined Utility Model Registration Application Publication No. 45-26780 discloses a lens shutter using two sets of rotatable sectors, first set of sectors serving as opening sectors and second set of sectors serving as closing sectors. In this lens shutter, in the shutter opening and closing operation, the opening sectors are moved in only one direction of opening the sectors and the closing sectors are moved in only one direction of closing the sectors. Accordingly, the foregoing reverse operation is not needed. There is no time lag caused by the reverse operation. Thus, the operation of the shutter can be performed at high speed.

Japanese Unexamined Patent Application Publication No. 6-43520 discloses an aperture mechanism having a plurality of sectors rotated in order to form and close an aperture. In the aperture mechanism, the center of pivot of each sector is pivotably supported by the corresponding supporting pin of a cover plate. A sliding pin disposed at one end of each sector is slidably fitted into the corresponding long hole of a sector plate which is rotated. In each sector, the supporting pin and the sliding pin are arranged so as to sandwich an aperture therebetween. The sector plate is rotated to pivot the sectors, thus changing the size of the aperture.

In macro photography, the image of a subject is enlarged and is then photographed. Hitherto, in macro photographing using a camera which cannot perform macro photography, a mechanism for attaching a macro lens as an auxiliary lens for macro photography, namely, a macro-lens adapter is attached in front of a taking lens of the camera. Light rays from a subject are allowed to pass through the attached macro-lens adapter, thus performing macro photography.

In general cameras each having a barrier, when the barrier is opened, the camera enters operating mode (the camera is turned on). When the barrier is closed, the camera enters non-operating mode (the camera is turned off). As mentioned above, in many cases, the opening and closing operation of the barrier is synchronized with the turn-on/off of the camera.

Conventional cameras include a camera having a detachable lens barrel. The lens barrel has therein a photographing optical system comprising a plurality of lenses and a drive mechanism for the lenses. The lens barrel is detachably mounted on a camera body having various components therein. Further, a member such as a lens cap for protecting the surface of the lens and blocking out unnecessary light that enters the camera through a gap between a lens fixing frame and the lens can be attached to the front surface of the lens barrel.

SUMMARY OF THE INVENTION

According to the present invention, there is provided a lens shutter system including: a shutter blade for opening and closing an opening through which light rays for photography pass; and a drive member for applying a driving force to open and close the shutter blade.

In the lens shutter system, the shutter blade is driven by the drive member, the shutter blade pivots about a first axis parallel to the optical axis of the light rays in one direction to perform the opening operation, and further, the shutter blade pivots about a second axis parallel to the optical axis of the light rays in the same direction as the one direction to perform the closing operation, the second axis being different from the first axis.

According to the present invention, there is provided another lens shutter system including: shutter blades serving as members for opening and closing an opening through which light rays for photography pass, each shutter blade being pivoted on the central point of first pivot and being pivoted on the central point of second pivot, each shutter blade having an edge segment constituting the edge of an aperture through which the light rays pass, the edge segment being formed between the central point of the first pivot and the central point of the second pivot, the central point of the first pivot and the central point of the second pivot being arranged in each shutter blade so as to sandwich the light rays therebetween; a drive member for applying a driving force to open and close the shutter blades.

In the lens shutter system, the shutter blades are driven by the drive member, the shutter blades are pivoted on the respective central points of the first pivot in one direction to form the aperture using the edge segments, and further, the shutter blades are pivoted on the respective central points of the second pivot in the same direction as the one direction to close the aperture.

According to the present invention, there is provided further another lens shutter system including: shutter blades serving as members for opening and closing an opening through which light rays for photography pass, each shutter blade being pivoted on the central point of first pivot and being pivoted on the central point of second pivot, each shutter blade having an edge segment constituting the edge of an aperture through which the light rays pass, the edge segment being formed between the central point of the first pivot and the central point of the second pivot, the central point of the first pivot and the central point of the second pivot being arranged on the outward of the light rays for photography respectively so as to sandwich the light rays therebetween; and a drive member for applying a driving force to open and close the shutter blades.

In the lens shutter system, the shutter blades are driven by the drive member, while the respective central points of the second pivot are being rotated about the optical axis in one direction, the shutter blades are pivoted on the respective central points of the first pivot in the same direction as the one direction to form the aperture using the edge segments, and while the respective central points of the first pivot are being rotated about the optical axis in the same direction as the one direction, the shutter blades are pivoted on the respective central points of the second pivot in the same direction as the one direction to close the aperture.

According to the present invention, there is provided still another lens shutter system including: shutter blades each having an edge segment constituting the edge of an aperture through which light rays for photography pass, each shutter blade being pivoted on the central point of first pivot and being pivoted on the central point of second pivot, each edge segment being formed between the central point of the first pivot and the central point of the second pivot, the central point of the first pivot and the central point of the second pivot being arranged on the outward of the light rays for photography respectively so as to sandwich the light rays therebetween; a first rotation drive member for rotating the central points of the second pivot about the optical axis in one direction and simultaneously pivoting the shutter blades on the respective central points of the first pivot in the same direction as the one direction to form the aperture using the edge segments; and a second rotation drive member for rotating the central points of the first pivot about the optical axis in the same direction as the one direction and simultaneously pivoting the shutter blades on the respective central points of the second pivot in the same direction as the one direction to close the aperture.

In the lens shutter system, the first rotation drive member pivots the shutter blades in the one direction to form the aperture and the second rotation drive member pivots the shutter blades in the same direction as the one direction to close the aperture.

According to the present invention, there is provided a camera capable of mounting a macro-lens adapter with a barrier which is slidable between a position to cover the surface of a macro lens used for enlarging a subject in macro photography and a position to expose the surface of the macro lens. The camera includes a taking lens and an operating-mode setting unit for switching the mode of the camera between operating mode and non-operating mode in accordance with the position of the slid barrier. The macro-lens adapter can be attached in front of the taking lens.

According to the present invention, there is provided a macro-lens adapter including: a macro lens for enlarging a subject in macro photography; and a barrier which is slidable between a position to cover the surface of the macro lens and a position to expose the surface of the macro lens.

According to the present invention, there is provided a camera including: a negative LCD which is disposed in front of a taking lens and which blocks out light in non-photographing mode; and a control unit for controlling the negative LCD so that the negative LCD allows light to pass through at least upon exposure.

According to the present invention, there is provided another camera including: a negative LCD which is disposed in front of a taking lens and which blocks out light in non-photographing mode; and a control unit for controlling the negative LCD so that the negative LCD allows light to pass through upon focusing and exposure.

Other features and advantages of the present invention will become more apparent from the following description.

DESCRIPTION OF THE PREFERRED EMBODIMENTS

Embodiments of the present invention will be described hereinbelow with reference to the drawings.

A lens shutter system according to a first embodiment of the present invention will now be described with reference to FIGS. 1 to 8.

Figure 1:
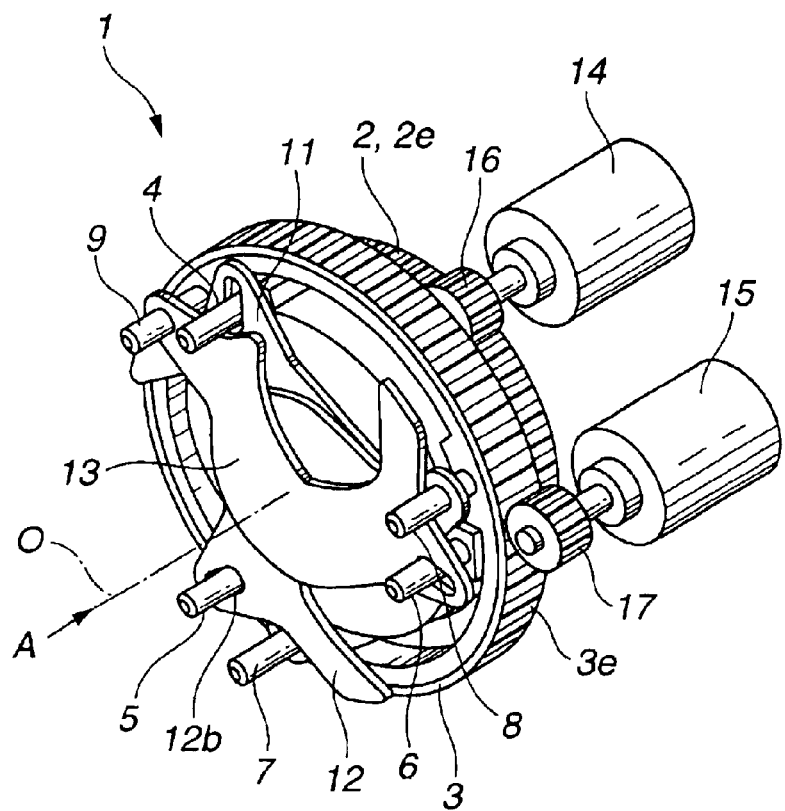
FIG. 1 is a perspective view of a lens shutter system according to a first embodiment of the present invention.
Figure 2:
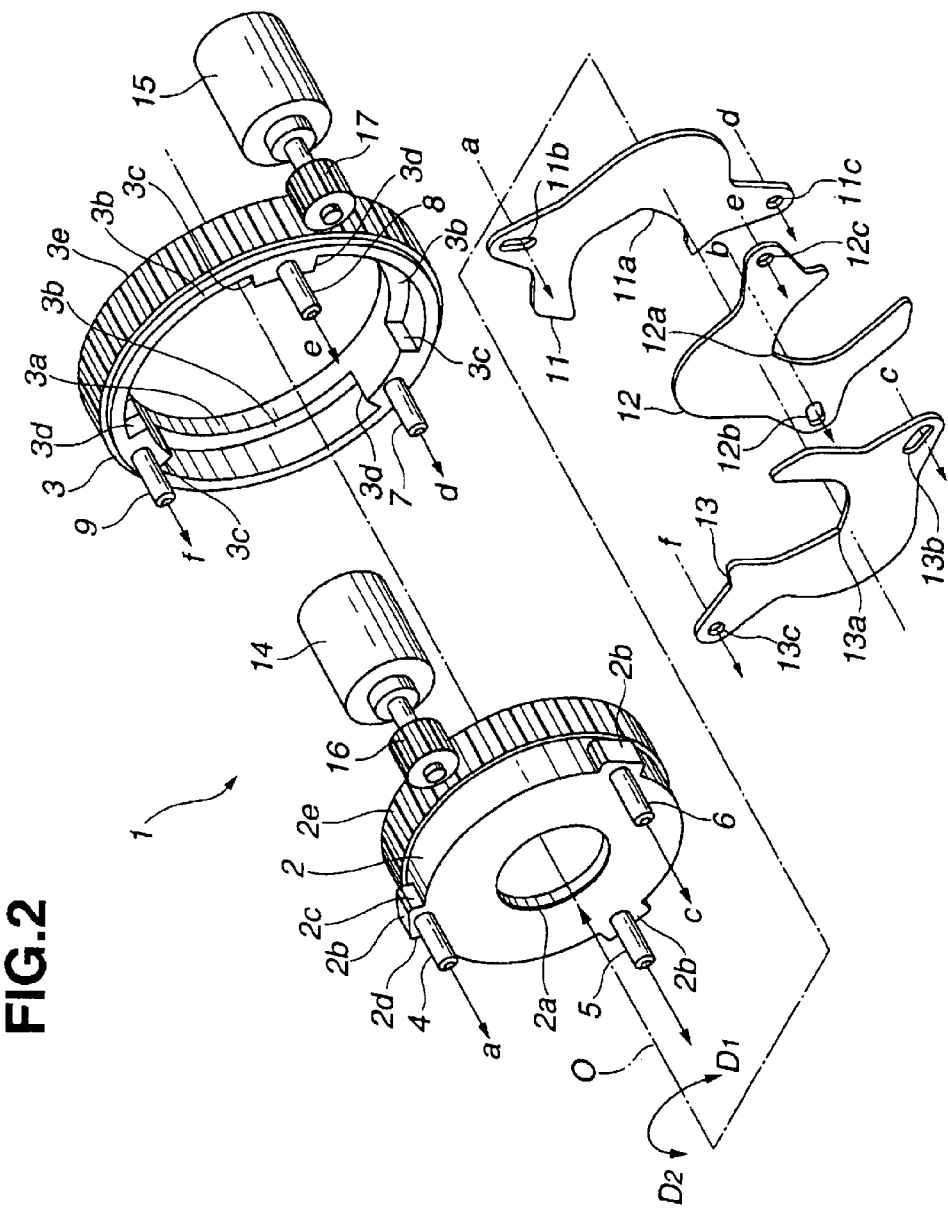
FIG. 2 is an exploded perspective view of the lens shutter system of FIG. 1.
Figure 3:
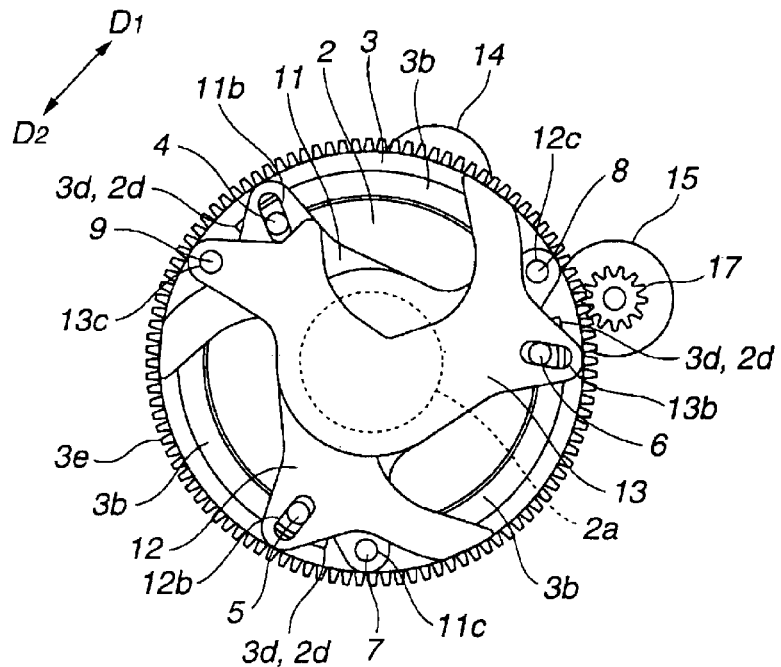
FIG. 3 is a view of the lens shutter system taken in the direction of an arrow A of FIG. 1, the system being in full-closing mode of the opening and closing operation thereof.
Figure 4:
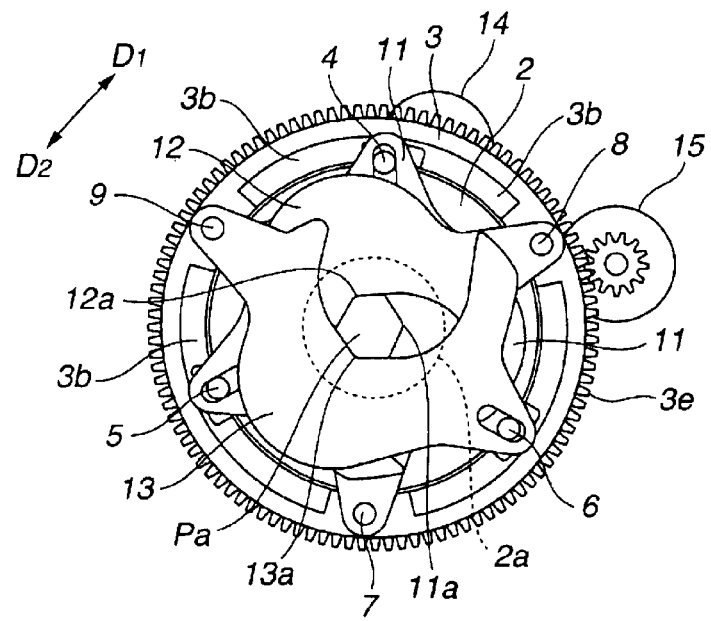
FIG. 4 is a view of the lens shutter system taken in the direction of the arrow A of FIG. 1, the system being in semi-opening mode or set-aperture forming mode of the opening and closing operation.
Figure 5:
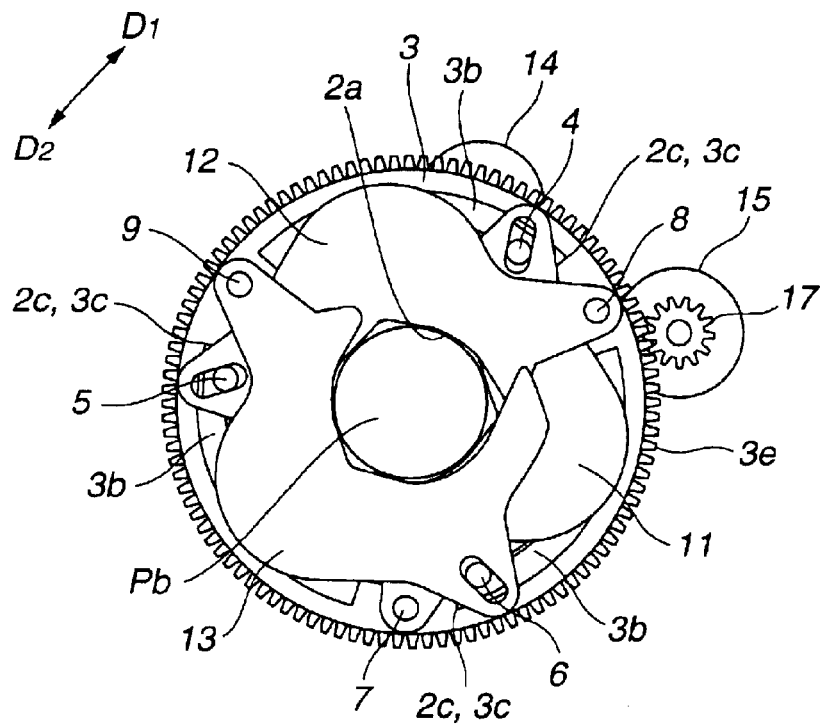
FIG. 5 is a view of the lens shutter system taken in the direction of the arrow A of FIG. 1, the system being in full-opening mode of the opening and closing operation.
Figure 6:
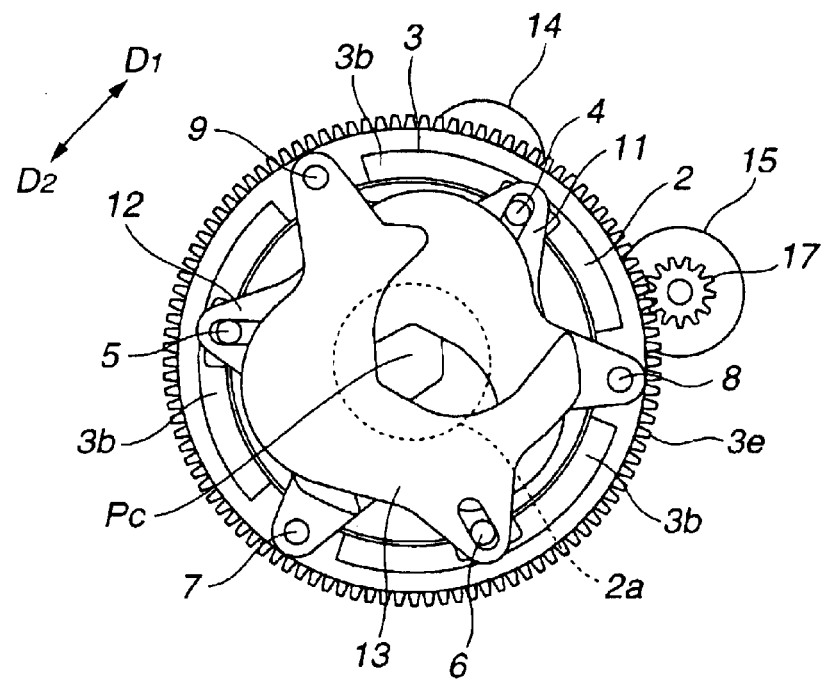
FIG. 6 is a view of the lens shutter system taken in the direction of the arrow A of FIG. 1, the system being in semi-opening mode or set-aperture forming mode of the opening and closing operation.
Figure 7:
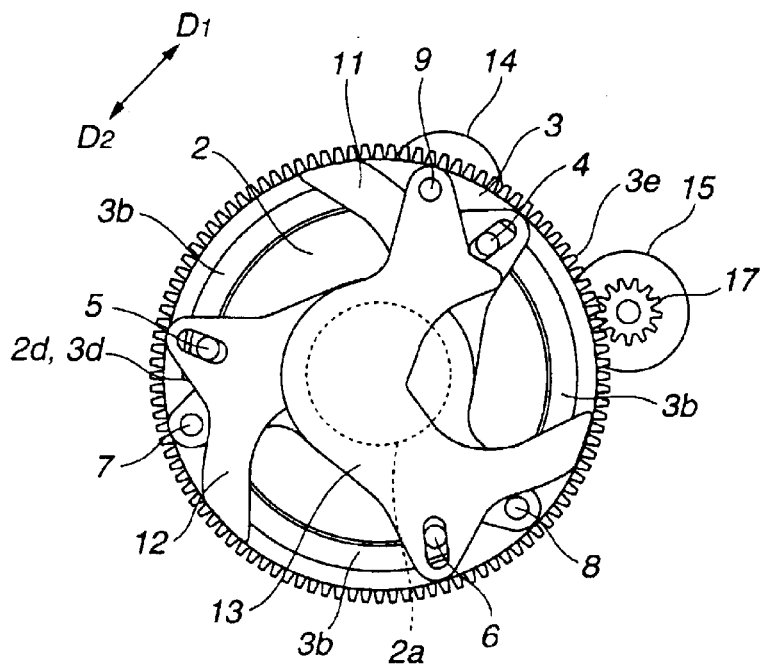
FIG. 7 is a view of the lens shutter system taken in the direction of the arrow A of FIG. 1, the system being in full-closing mode of the opening and closing operation.
Figure 8:
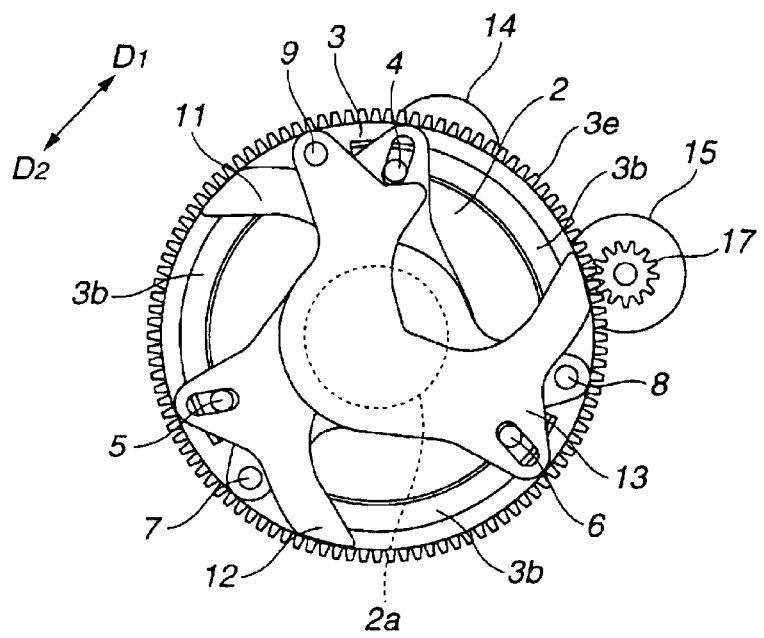
FIG. 8 is a view of the lens shutter system taken in the direction of the arrow A of FIG. 1, the system being in shutter closing mode after the set-aperture forming mode of the opening and closing operation.

FIG. 1 is a perspective view of the lens shutter system according to the first embodiment of the present invention. FIG. 2 is an exploded perspective view of the lens shutter system. FIGS. 3 to 8 show the opening and closing operation of the lens shutter system taken in the direction of an arrow A of FIG. 1. FIG. 3 shows closing mode. FIG. 4 shows semi-opening mode or set-aperture forming mode after the mode of FIG. 3. FIG. 5 shows full-opening mode after the mode of FIG. 4. FIG. 6 shows the semi-opening mode or set-aperture forming mode after the mode of FIG. 5. FIG. 7 shows full-closing mode subsequent to the mode of FIG. 6. FIG. 8 shows shutter closing mode after the set-aperture forming mode.

In the following description regarding the first and second embodiments, it is assumed that light for photography enters the front of the device. The direction of rotation is shown as viewed from a subject (in the direction A in FIG. 1). Clockwise rotation is set to rotation in the direction D1 and counterclockwise rotation is set to rotation in the direction D2.

According to the present embodiment, the lens shutter system 1 mainly comprises an inner drive ring 2, an outer drive ring 3, shutter blades 11, 12, and 13, and drive motors 14 and 15 as stepping motors.

The inner drive ring 2 comprises: a shutter opening 2a whose center indicates an optical axis O; drive pins 4, 5, and 6 serving as second shafts which are arranged around the shutter opening 2a and protrude from the front surface of the ring 2 in parallel to the optical axis O; three protrusions 2b which protrude from the rim of the ring 2 outward to support the respective drive pins 4, 5, and 6; and a gear 2e arranged on the back of the outer periphery of the ring 2. The right side surface (as viewed from the front) of each protrusion 2b functions as a contact surface 2c. The left side surface (as viewed from the front) of each protrusion 2b serves as a contact surface 2d.

The outer drive ring 3 has an opening whose center indicates the optical axis O. The outer drive ring 3 comprises: a fitting portion 3a in which the outer periphery of the inner drive ring 2 is rotatably fitted; drive pins 7, 8, and 9 serving as first shafts which protrude from the front surface of the ring 3 in parallel to the optical axis O so as to surround the shutter opening 2a; three arc-shaped recesses 3b which are formed between respective contact surfaces 3c and 3d as the left and right side surfaces (as viewed from the front) of respective protrusions supporting the drive pins 7, 8, and 9, the recesses 3b being formed between the drive pins 7, 8, and 9 along the circumference thereof; and a gear 3e formed on the outer periphery thereof.

The outer drive ring 3 is supported by a drive ring supporting member (not shown) so as to be rotatable about the optical axis O. The inner drive ring 2 is supported by the outer drive ring 3 so as to be rotatable about the optical axis O.

The shutter blade 11 comprises: a long hole 11b in which the drive pin 4 is slidably fitted and about which second pivot is performed; a pin hole 11c in which the drive pin 7 is rotatably fitted and about which first pivot is performed; and an aperture edge segment 11a which is formed between the long hole 11b and the pin hole 11c and which serves as a part of the edge of a shutter aperture.

The shutter blade 12 comprises: a long hole 12b in which the drive pin 5 is slidably fitted and about which the second pivot is performed; a pin hole 12c in which the drive pin 8 is rotatably fitted and about which the first pivot is performed; and an aperture edge segment 12a which serves as a part of the edge of the shutter aperture.

The shutter blade 13 comprises: a long hole 13b in which the drive pin 6 is slidably fitted and about which the second pivot is performed; a pin hole 13c in which the drive pin 9 is rotatably fitted and about which the first pivot is performed; and an aperture edge segment 13a which serves as a part of the edge of the shutter aperture.

The drive pins 4, 5, and 6 are slidable in the respective long holes 11b, 12b, and 13b in the longitudinal direction of the long holes relative to each other.

A pinion 16, fixed to the output shaft of the drive motor 14, engages with the gear 2e of the inner drive ring 2. A pinion 17, fixed to the output shaft of the drive motor 15, engages with the gear 3e of the outer drive ring 3.

According to the present embodiment, the lens shutter system 1 with the above structure realizes various controls for the shutter opening and closing operation. A first shutter control operation will now be described with reference to FIGS. 3 to 8.

When the first shutter control operation is applied, an aperture system is used in conjugation with the lens shutter system. In this shutter control operation, the aperture system is set so as to form a predetermined aperture. In shutter full-closing mode of FIG. 3, while the drive motor 15 is being stopped, the drive motor 14 is driven counterclockwise to rotate only the inner drive ring 2 in the direction D1 (clockwise) by a predetermined angle. Due to the rotation of the inner drive ring 2 in the direction D1, the protrusions 2b slide in the respective recesses 3b, so that the drive pins 4, 5, and 6 rotate about the optical axis O. Due to the rotation, the shutter blades 11, 12, and 13 pivot about the respective drive pins 7, 8, and 9 (namely, the pin holes 11c, 12c, and 13c). Simultaneously, the pin holes 11c, 12c, and 13c move relative to the respective drive pins 7, 8, and 9. Then, a semi-aperture Pa is formed as shown in FIG. 4.

When only the inner drive ring 2 is further rotated in the direction D1 (clockwise) by a predetermined angle, the shutter blades 11, 12, and 13 continuously pivot on the respective drive pins 7, 8, and 9 in a manner similar to the above. As shown in FIG. 5, each contact surface 2c of each protrusion 2b of the inner drive ring 2 is come into contact with the corresponding contact surface 3c of the outer drive ring 3, resulting in shutter full-opening mode in which the shutter opening 2a is exposed (full-aperture Pb). The drive motor 14 is then stopped.

After that, in order to close the shutter after predetermined elapsed time, while the drive motor 14 is being stopped, the drive motor 15 is driven so as to rotate counterclockwise to rotate only the outer drive ring 3 in the direction D1 by a predetermined angle. Thus, the drive pins 7, 8, and 9 rotate about the optical axis O. Due to the rotation, the shutter blades 11, 12, and 13 pivot about the drive pins 4, 5, and 6 (namely, the long holes 11b, 12b, and 13b), respectively. Simultaneously, the pin holes 11c, 12c, and 13c move relative to the drive pins 7, 8, and 9, respectively. Thus, a semi-aperture Pc is formed as shown in FIG. 6.

Subsequently, when the outer drive ring 3 is further driven so as to rotate in the direction D1 (clockwise) by a predetermined angle, the shutter blades 11, 12, and 13 continuously pivot about the drive pins 4, 5, and 6, respectively. Consequently, as shown in FIG. 7, each contact surface 3d of the outer drive ring 3 is come into contact with the corresponding contact surface 2d of the inner drive ring 2, resulting in shutter closing mode. Then, the drive motor 15 is stopped.

After that, in order to again open and close the shutter, the control operation shown in FIGS. 3 to 7 is repeated.

A second shutter control operation of the lens shutter system 1 according to the first embodiment will now be described.

In the first shutter control operation, the inner and outer drive rings 2 and 3 are rotated in the direction D1 (clockwise) as shown in FIG. 4 and the like. In the present second control operation for opening and closing the shutter, the outer and inner drive rings 3 and 2 are rotated in the direction D2 (counterclockwise) to open and close the shutter. In other words, the outer drive ring 3 is rotated in the direction D2 to change the shutter closing mode of FIG. 7 to the semi-opening mode of FIG. 6 and then change the mode to the full-opening mode of FIG. 5. Subsequently, the inner drive ring 2 is rotated in the direction D2 to change the shutter opening mode of FIG. 5 to the semi-opening mode of FIG. 4 and then change the mode to the full-closing mode of FIG. 3.

A third shutter control operation of the lens shutter system 1 according to the first embodiment will now be described. When the third shutter control operation is applied, it is unnecessary to provide a separate aperture system because the lens shutter system 1 has an aperture function.

In this shutter opening and closing control operation, after the opening mode of the shutter blades reaches predetermined set-aperture forming mode, the opening operation is changed to the closing operation. In the shutter closing mode shown in FIG. 3, only the inner drive ring 2 is rotated in the direction D1 (clockwise) by a predetermined angle. Due to the rotation of the inner drive ring 2, the shutter blades 11, 12, and 13 pivot about the drive pins 7, 8, and 9, respectively, thus forming the set aperture Pa shown in FIG. 4 in the predetermined set-aperture forming mode. The inner drive ring 2 is then stopped. Subsequently, the outer drive ring 3 is rotated in the direction D1. Due to the rotation of the outer drive ring 3, the shutter blades 11, 12, and 13 pivot about the drive pins 4, 5, and 6, respectively, resulting in the shutter closing mode shown in FIG. 8.

Subsequently, in order to again perform the shutter opening and closing operation, the inner drive ring 2 is rotated in the direction D1 in the mode of FIG. 8. After that, the outer drive ring 3 is rotated in the direction D1. Thus, the shutter is opened and closed.

As mentioned above, in the case where the first and second shutter control operations are applied to the lens shutter system 1 according to the first embodiment, when the mode is switched from the shutter opening operation to the closing operation, it is unnecessary to reverse the direction of rotation of the inner and outer drive rings 2 and 3. Consequently, the shutter opening and closing operation can be realized at high speed. In addition, for the shutter blades 11, 12, and 13, the directional component of rotation about the center of gravity of each blade in the opening operation is the same (direction D1 or D2) as that in the closing operation. Thus, the lens shutter system 1 can be operated at higher speed than that of a conventional lens shutter system in which sectors reciprocate in opening and closing a shutter.

Particularly, when the third shutter control operation is applied, an aperture system is not needed. Thus, the structure of an exposure system of the camera can be simplified.

According to the first embodiment, the two drive motors 14 and 15 are applied to the lens shutter system 1. The invention is not limited to this case. The following structure can also be used: The forward and backward rotations of one drive motor can be switched using a clutch so as to separately rotate the two drive rings 2 and 3.

The stepping motors are used as the drive motors. If a sensor for detecting the amount of rotation is arranged, normal DC motors can be used.

Other shutter control operations of the lens shutter system 1 according to the first embodiment will now be described, the control operation being different from the foregoing first, second, and third shutter control operations.

In a fourth shutter control operation, the first and second shutter control operations are alternately executed to open and close the shutter. First, the inner drive ring 2 is rotated in the direction D1 on the basis of the foregoing first shutter control operation to shift the mode from the shutter closing mode of FIG. 3 to the opening mode of FIG. 5. Then, the outer drive ring 3 is rotated in the direction D1 to shift the mode from the shutter opening mode of FIG. 5 to the closing mode of FIG. 7.

When the shutter is further opened and closed, on the basis of the foregoing second shutter control operation, the outer drive ring 3 is rotated in the direction D2 opposite to the above direction to pivot the shutter blades so as to shift the mode from the closing mode of FIG. 7 to the opening mode of FIG. 5. The inner drive ring 2 is then rotated in the direction D2 to shift the mode from the shutter opening mode of FIG. 5 to the closing mode of FIG. 3.

In the application of the fourth shutter control operation, the inner and outer drive rings 2 and 3 are not reversed in one cycle of the shutter opening and closing operation. Thus, the shutter operation can be performed at high speed.

It is unnecessary to rotate the inner and outer drive rings 2 and 3 by one revolution. For the gear arranged on the outer periphery of each of the inner and outer drive rings, the gear is arranged at one portion of the outer periphery, thus realizing enough rotation. Accordingly, when the fourth shutter control operation is applied, another mechanism can be arranged on the outer periphery excluding the portion where the gear is disposed. Thus, the lens shutter system can be made more compact. When the present shutter control operation is applied, the inner and outer drive rings 2 and 3 rotate in both the directions. The following structure can also be used: One drive motor is used as a driving source to drive the inner and outer drive rings 2 and 3 via a clutch.

A fifth shutter control operation of the lens shutter system 1 according to the first embodiment will now be described.

In the foregoing first to fourth shutter control operations, the drive motor 14 or 15, which is driving for the opening operation, is stopped in the shutter full-opening mode or the shutter set-aperture forming mode. In the fifth shutter control operation, if it is necessary to maintain the shutter full-opening mode or shutter set-aperture forming mode for a predetermined period of time, the drive motor 14 or 15 which is driving for the opening operation is not stopped and the other drive motor 15 or 14 is started to drive. Both the drive motors are controlled so as to drive at the same speed. The drive motors are controlled in this manner, so that the shutter full-opening mode or the shutter set-aperture forming mode can be maintained for a desired period of time.

After a predetermined elapsed time, the drive motor 14 or 15 which is driving for the opening operation is stopped and the other drive motor 15 or 14 is continuously driven to perform the closing operation. Upon full-closing, the drive motor 15 or 14 is also stopped.

According to the fifth shutter control operation, while the drive motors are driven at a uniform speed or higher, the shutter blades 11, 12, and 13 are rotated so as to maintain the formed aperture, thus averaging exposure. Consequently, an out of focus image without anisotropy, in other words, an averaged out of focus image or a natural out of focus image can be obtained.

A lens shutter system according to a second embodiment of the present invention will now be described with reference to FIGS. 9 to 37.

Figure 9:
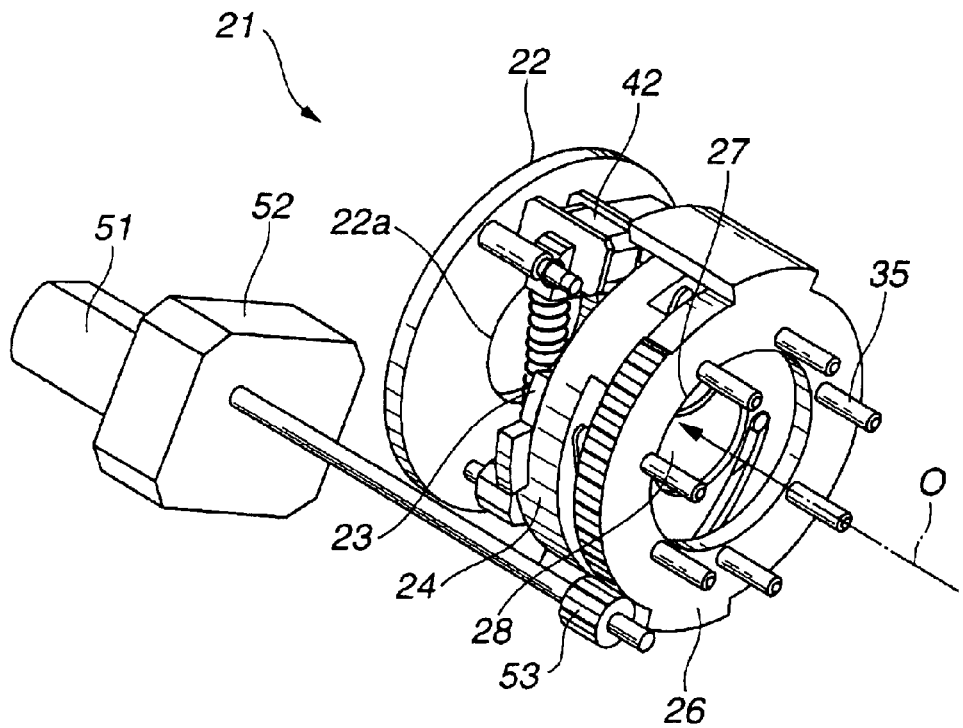
FIG. 9 is a perspective view of a lens shutter system according to a second embodiment of the present invention, the system being observed from the front.
Figure 10:
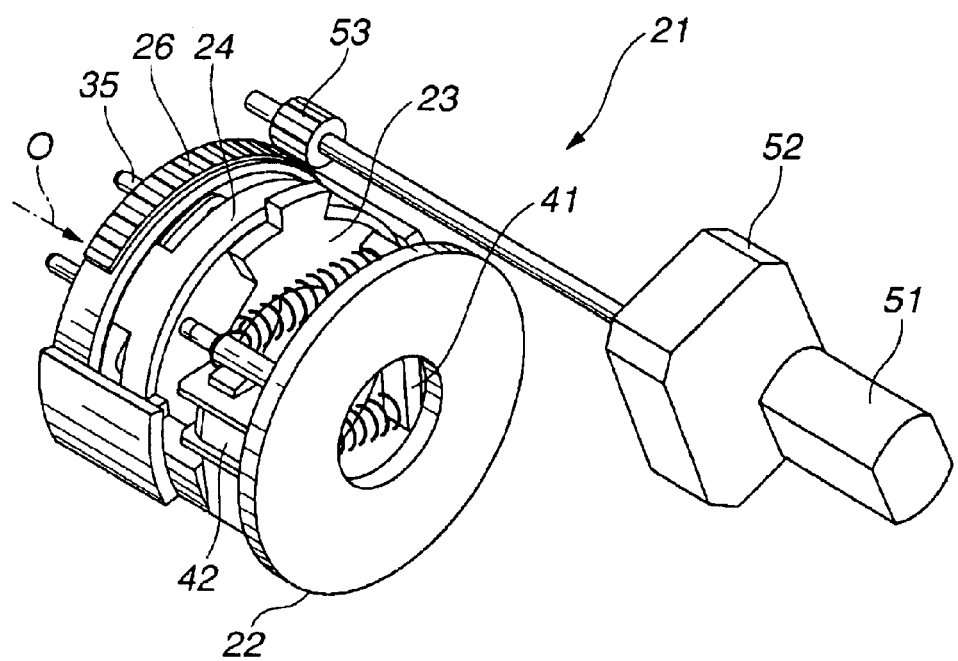
FIG. 10 is a perspective view of the lens shutter system of FIG. 9, the system being observed from the rear.
Figure 11:
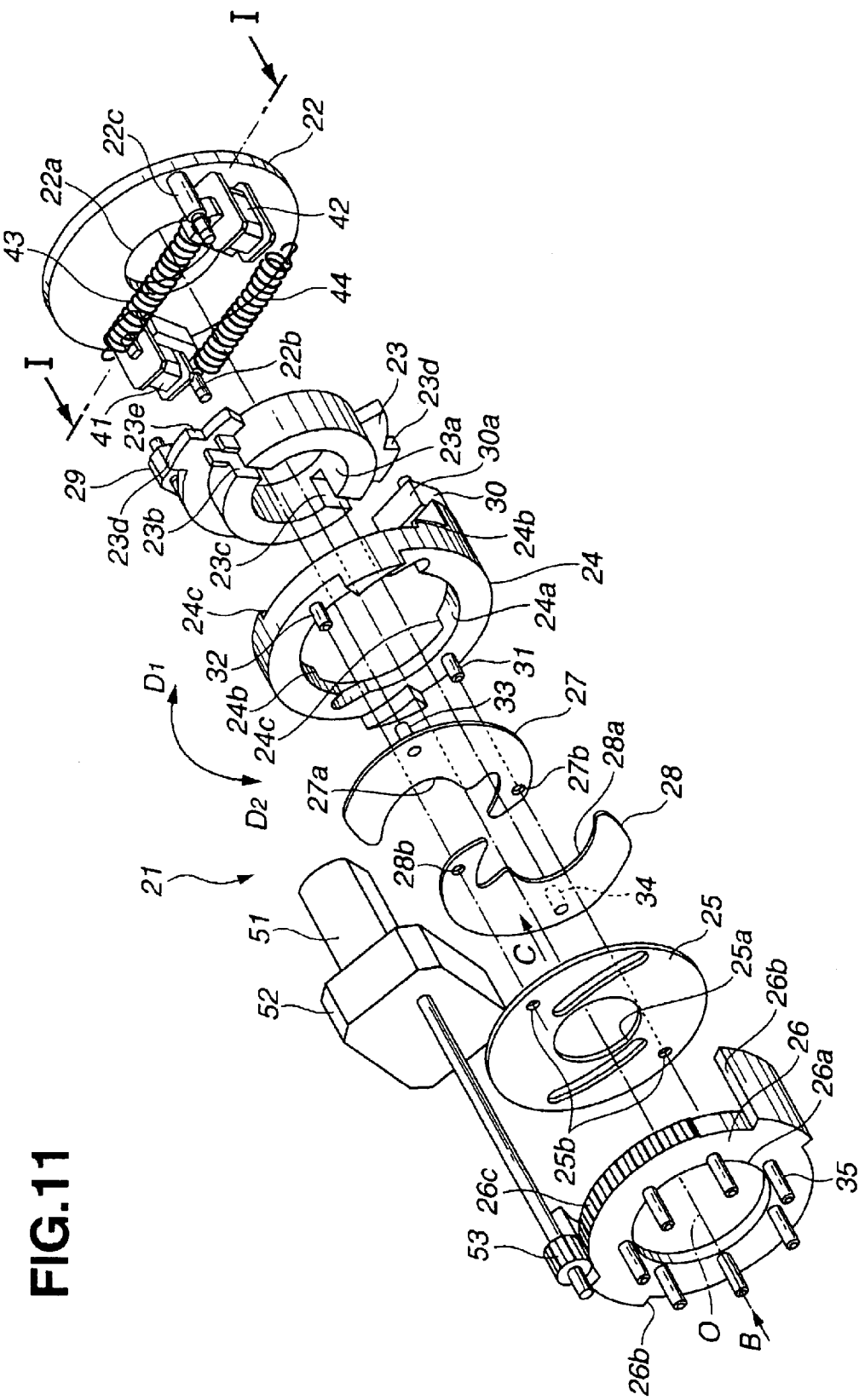
FIG. 11 is an exploded perspective view of the lens shutter system of FIG. 9, the system being observed from the front.
Figure 12:
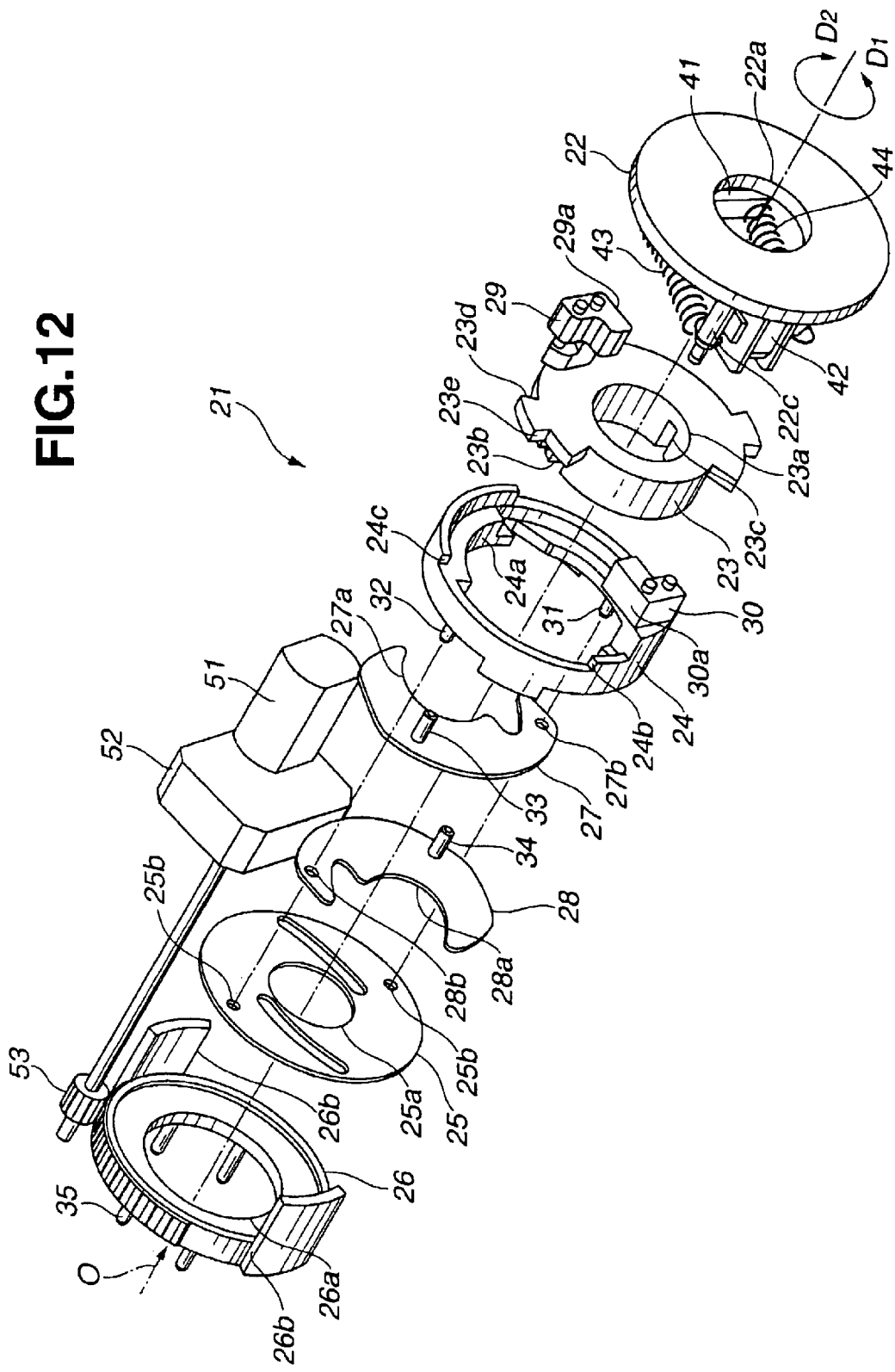
FIG. 12 is an exploded perspective view of the lens shutter system of FIG. 9, the system being observed from the rear.
Figure 13:
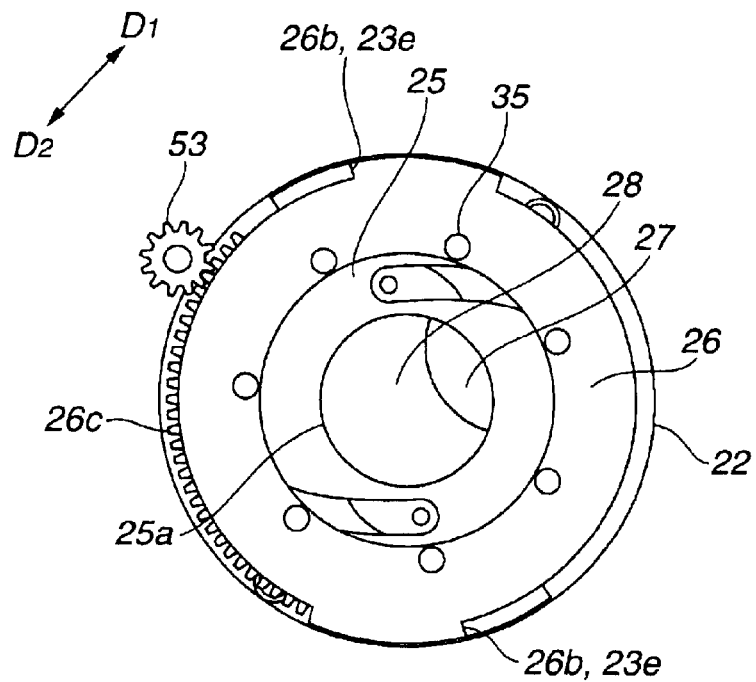
FIG. 13 is a view of the lens shutter system of FIG. 9 taken in the direction of an arrow B of FIG. 11, the system being in initial full-closing mode of the opening and closing operation thereof.
Figure 14:
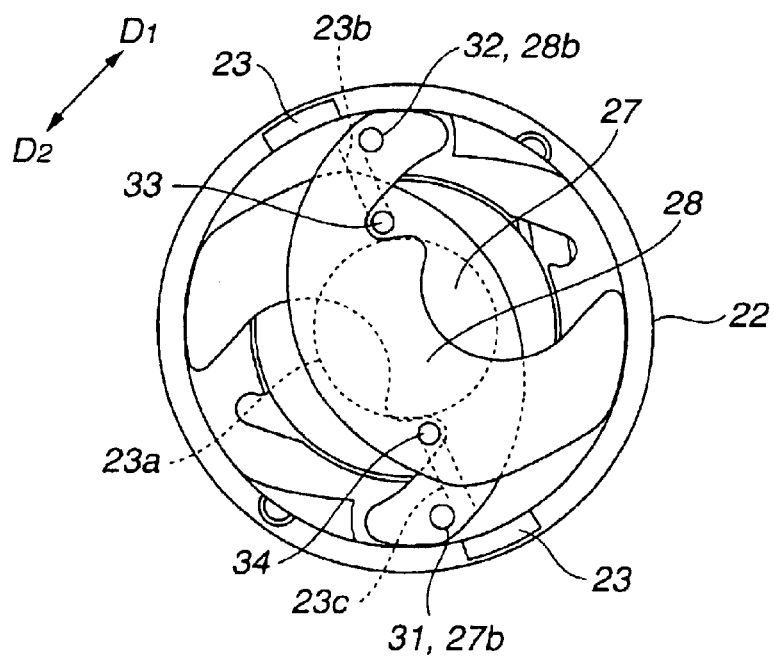
FIG. 14 is a view of the lens shutter system of FIG. 9 taken in the direction of an arrow C of FIG. 11, the system being in the initial full-closing mode of the opening and closing operation.
Figure 15:
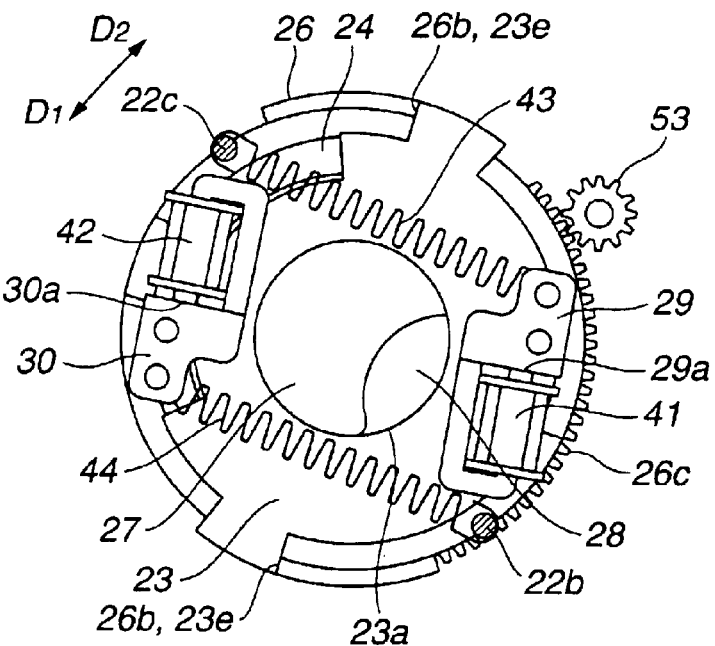
FIG. 15 is a sectional view of the lens shutter system of FIG. 9 at the line I—I of FIG. 11, the system being in the initial full-closing mode of the opening and closing operation.
Figure 16:
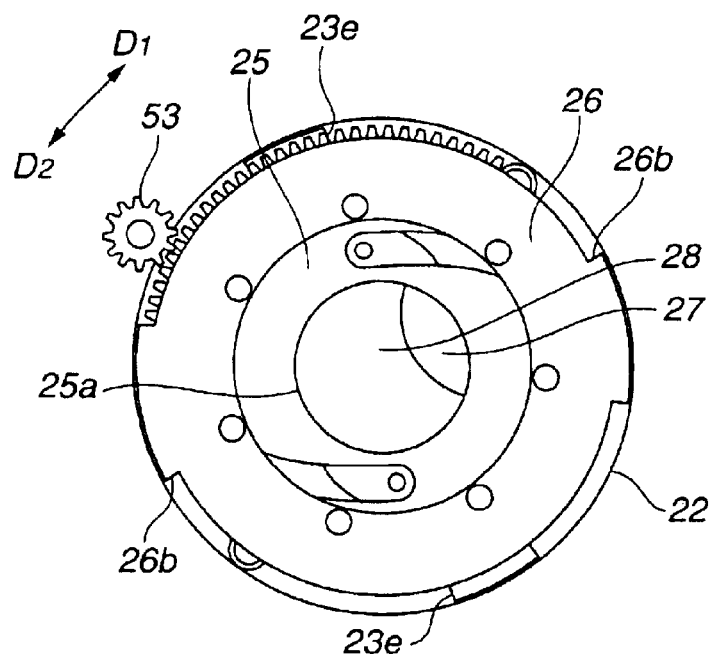
FIG. 16 is a view of the lens shutter system of FIG. 9 taken in the direction of the arrow B of FIG. 11, the system being in full-closing mode of the opening and closing operation.
Figure 17:
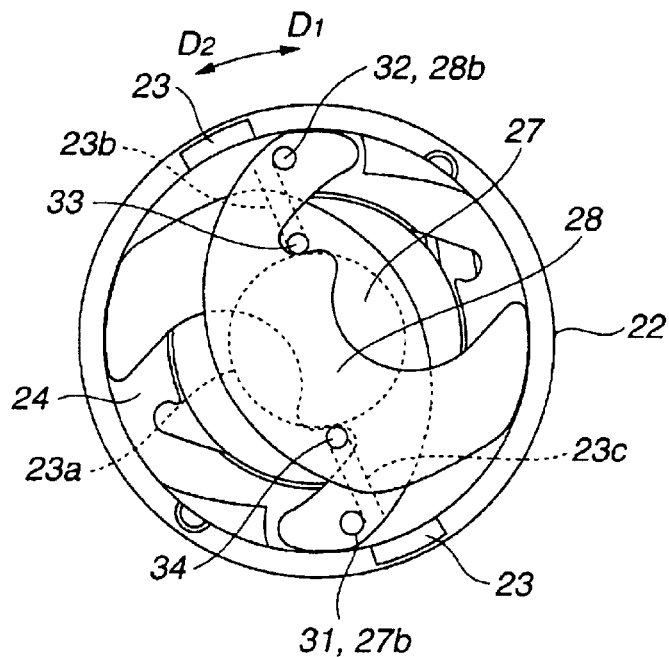
FIG. 17 is a view of the lens shutter system of FIG. 9 taken in the direction of the arrow C of FIG. 11, the system being in the full-closing mode of the opening and closing operation.
Figure 18:
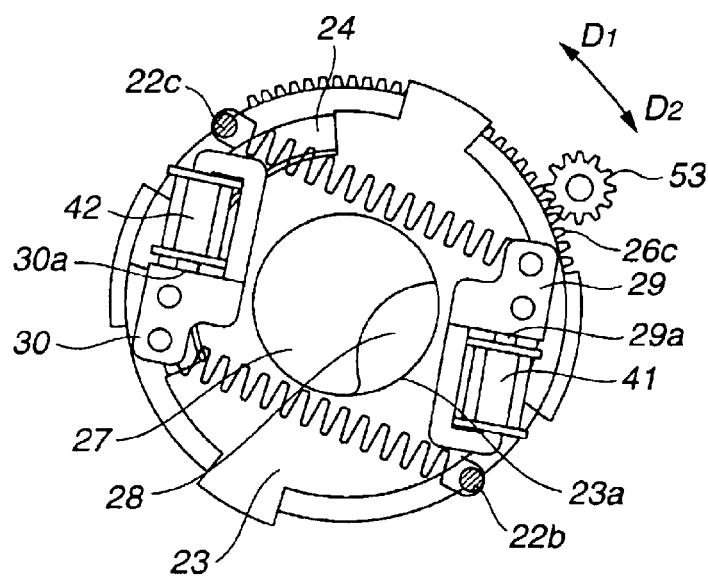
FIG. 18 is a sectional view of the lens shutter system of FIG. 9 at the line I—I of FIG. 11, the system being in the full-closing mode of the opening and closing operation.
Figure 19:
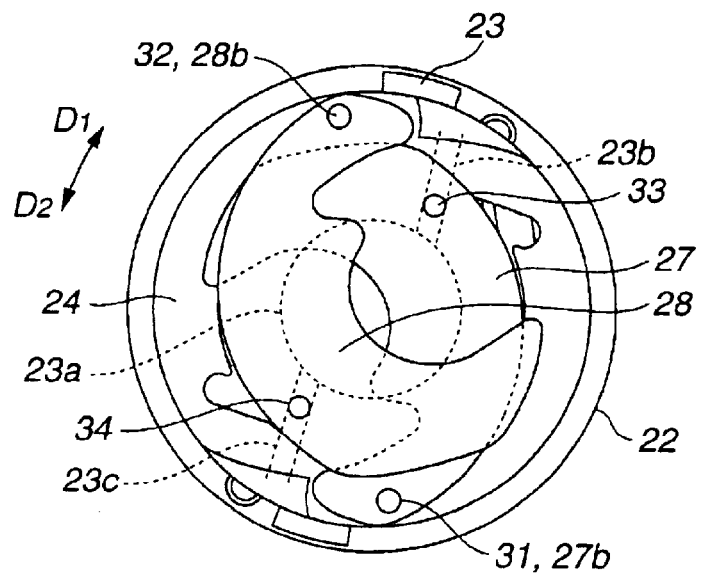
FIG. 19 is a view of the lens shutter system of FIG. 9 taken in the direction of the arrow C of FIG. 11, the system being in opening start mode of the opening and closing operation.
Figure 20:
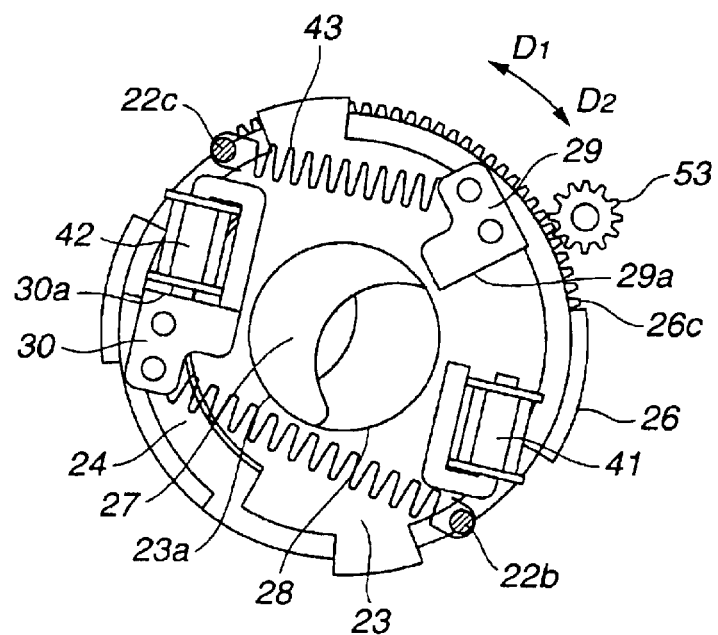
FIG. 20 is a sectional view of the lens shutter system of FIG. 9 at the line I—I of FIG. 11, the system being in the opening start mode of the opening and closing operation.
Figure 21:
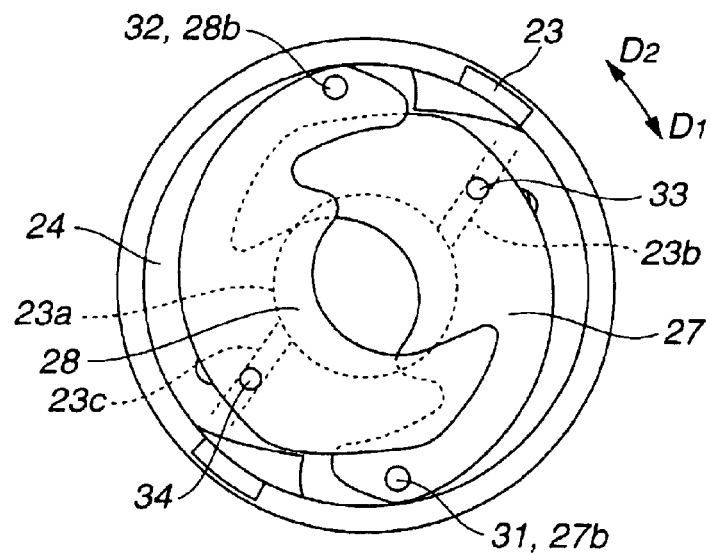
FIG. 21 is a view of the lens shutter system of FIG. 9 taken in the direction of the arrow C of FIG. 11, the system being in semi-opening mode of the opening and closing operation.
Figure 22:
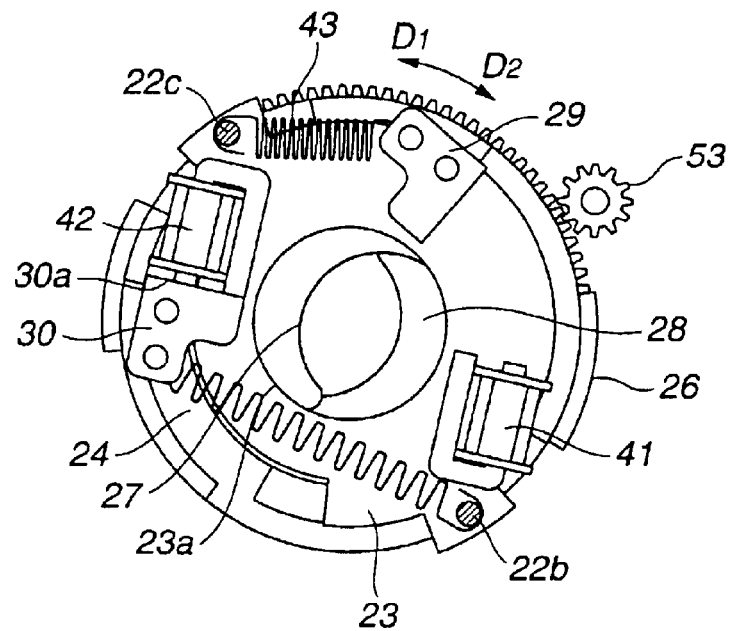
FIG. 22 is a sectional view of the lens shutter system of FIG. 9 at the line I—I of FIG. 11, the system being in the semi-opening mode of the opening and closing operation.
Figure 23:
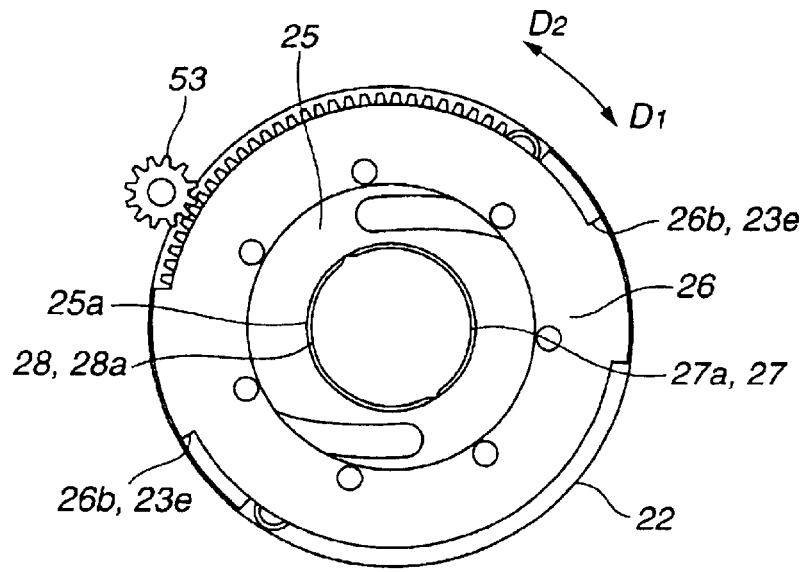
FIG. 23 is a view of the lens shutter system of FIG. 9 taken in the direction of the arrow B of FIG. 11, the system being in full-opening mode of the opening and closing operation.
Figure 24:
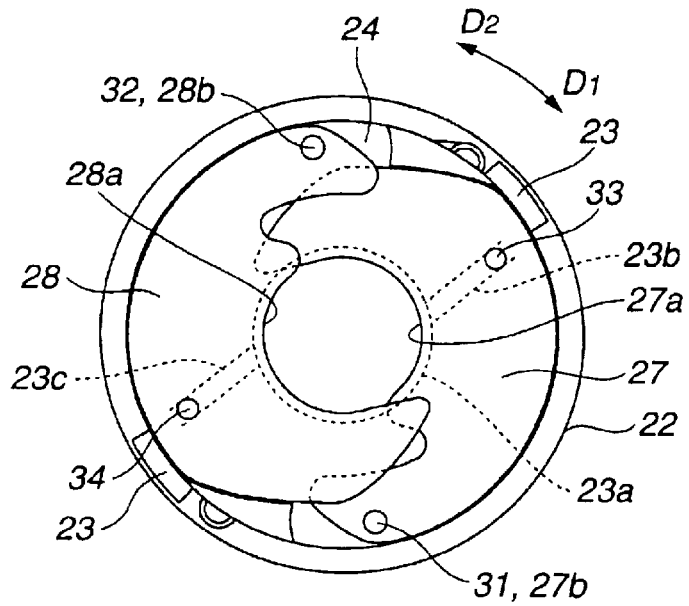
FIG. 24 is a view of the lens shutter system of FIG. 9 taken in the direction shown by the arrow C of FIG. 11, the system being in the full-opening mode of the opening and closing operation.
Figure 25:
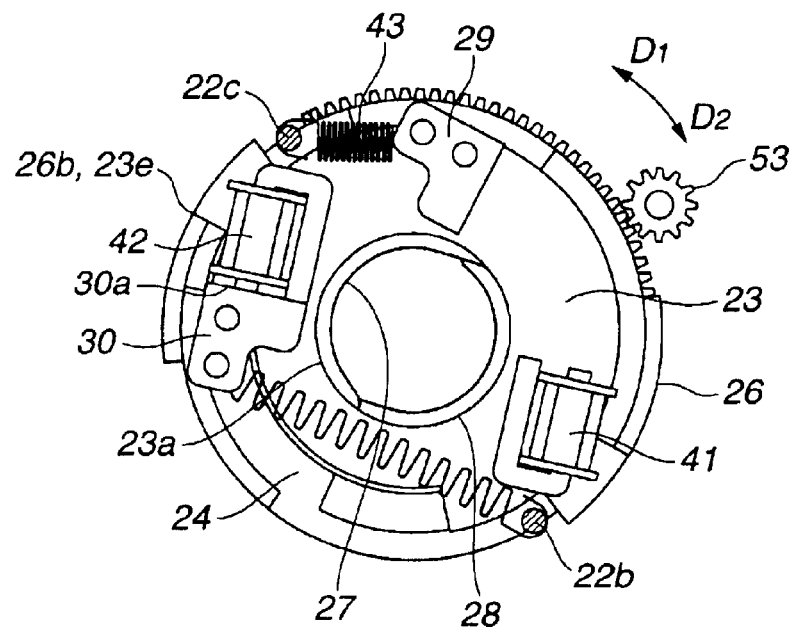
FIG. 25 is a sectional view of the lens shutter system of FIG. 9 at the line I—I of FIG. 11, the system being in the full-opening mode of the opening and closing operation.
Figure 26:
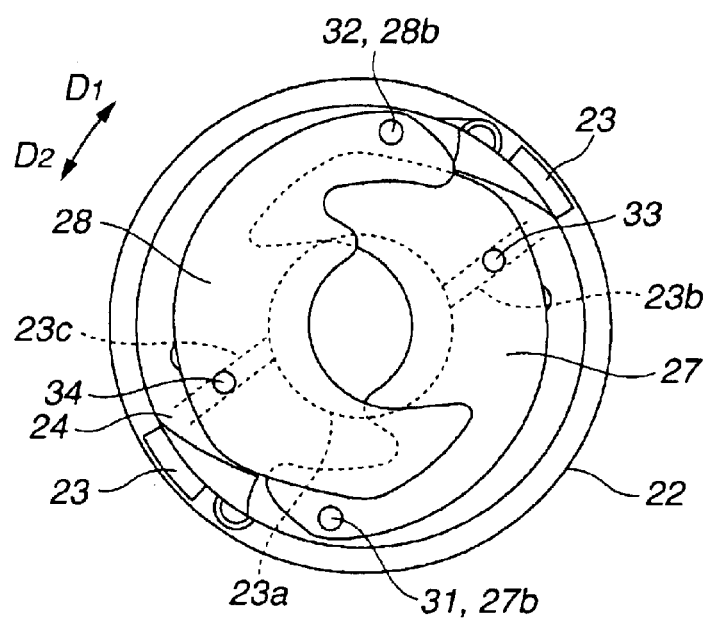
FIG. 26 is a view of the lens shutter system of FIG. 9 taken in the direction of the arrow C of FIG. 11, the system being in semi-closing mode of the opening and closing operation.
Figure 27:
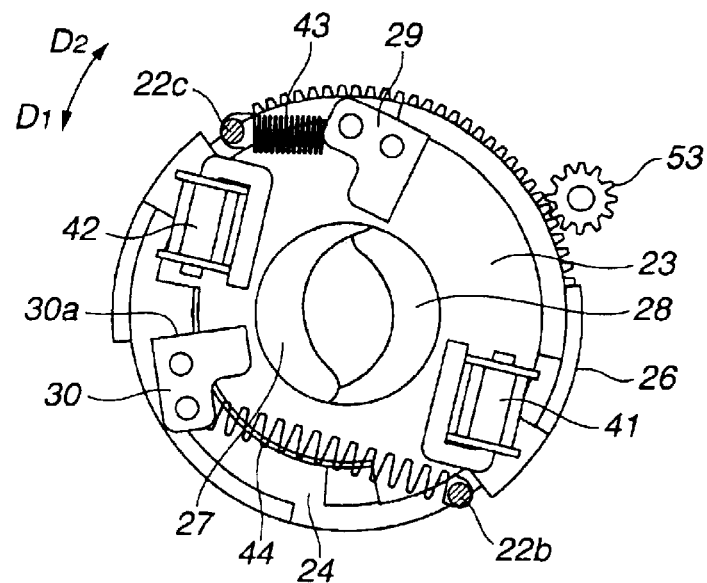
FIG. 27 is a sectional view of the lens shutter system of FIG. 9 at the line I—I of FIG. 11, the system being in the semi-closing mode of the opening and closing operation.
Figure 28:
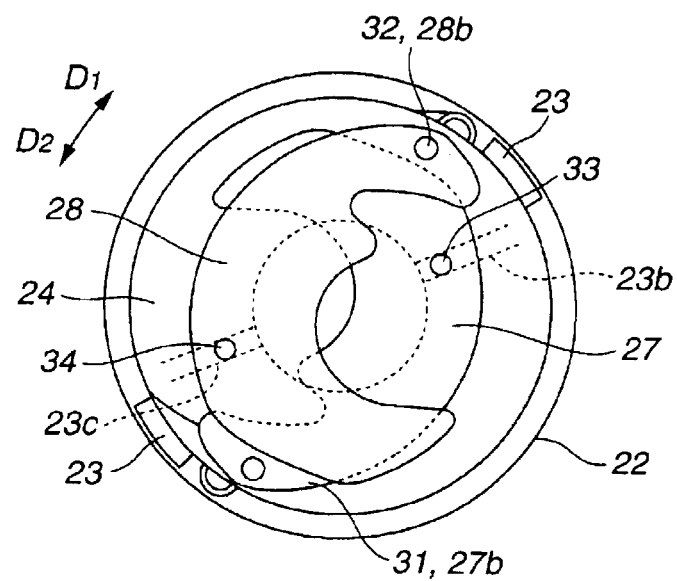
FIG. 28 is a view of the lens shutter system of FIG. 9 taken in the direction of the arrow C of FIG. 11, the system being in just-before-closing mode of the opening and closing operation.
Figure 29:
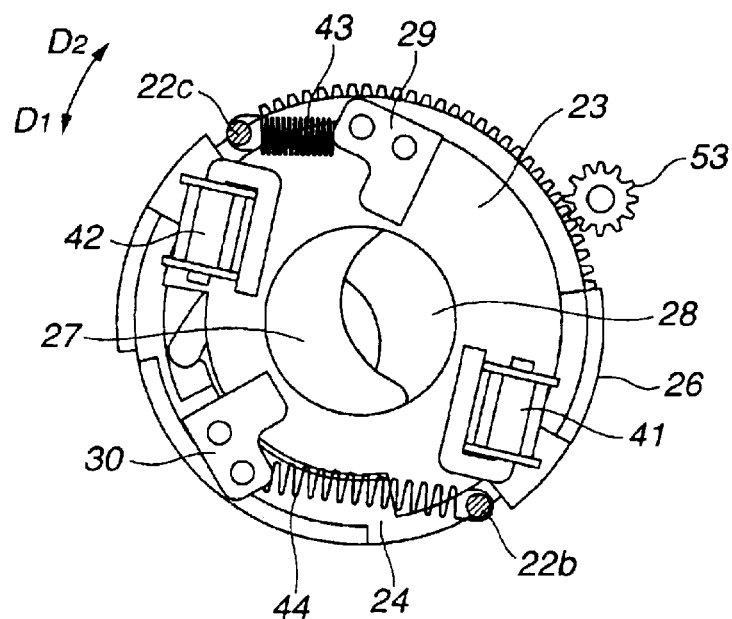
FIG. 29 is a sectional view of the lens shutter system of FIG. 9 at the line I—I of FIG. 11, the system being in the just-before-closing mode of the opening and closing operation.
Figure 30:
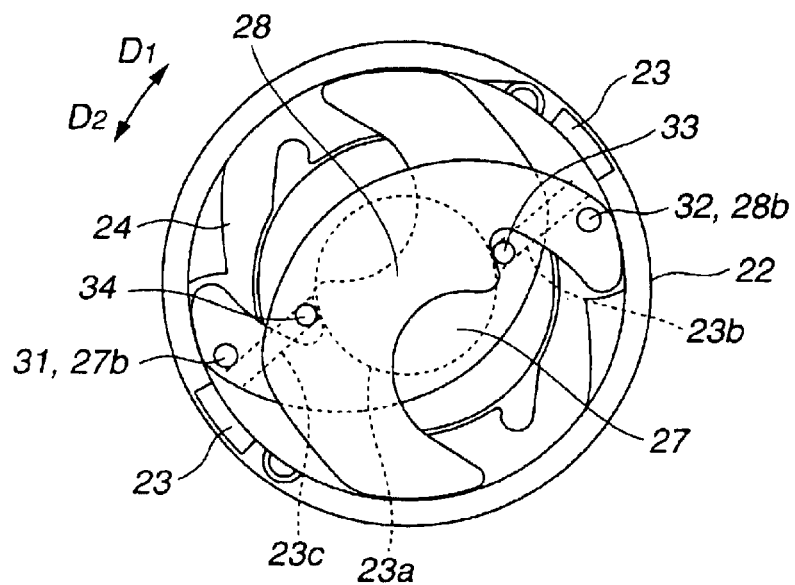
FIG. 30 is a view of the lens shutter system of FIG. 9 taken in the direction of the arrow C of FIG. 11, the system being in the full-closing mode of the opening and closing operation.
Figure 31:
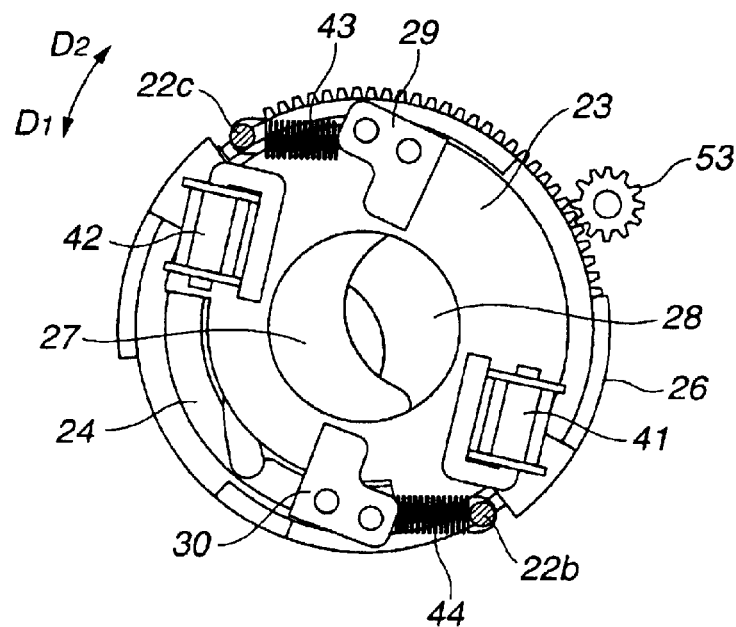
FIG. 31 is a sectional view of the lens shutter system of FIG. 9 at the line I—I of FIG. 11, the system being in the full-closing mode of the opening and closing operation.
Figure 32:
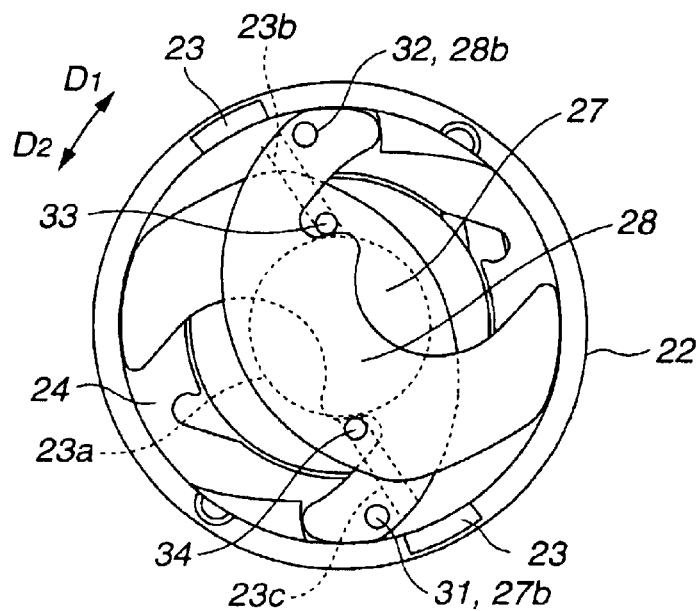
FIG. 32 is a view of the lens shutter system of FIG. 9 taken in the direction of the arrow C of FIG. 11, the system being in charge mode of the opening and closing operation while a shutter is being fully closed.
Figure 33:
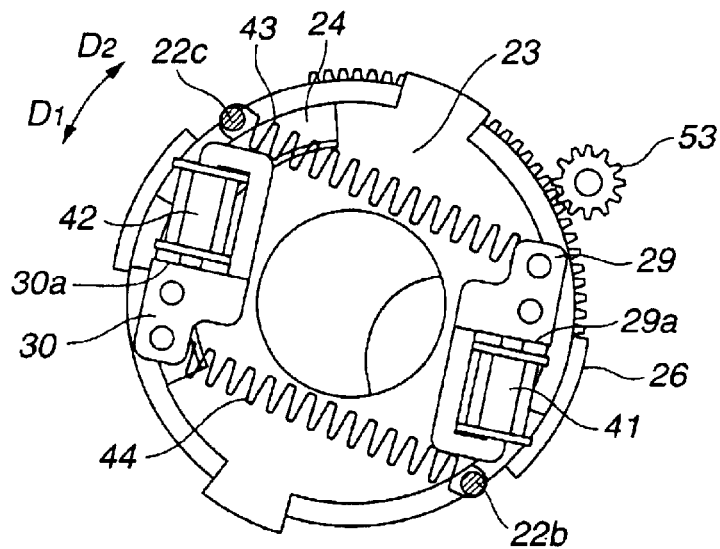
FIG. 33 is a sectional view of the lens shutter system of FIG. 9 at the line I—I of FIG. 11, the system being in the charge mode of the opening and closing operation while the shutter is being closed.

FIGS. 9 and 10 are perspective views of the lens shutter system according to the second embodiment. FIG. 9 shows the system as viewed from the front. FIG. 10 shows the system as viewed from the rear. FIGS. 11 and 12 are exploded perspective views of the lens shutter system. FIG. 11 shows the system as viewed from the front. FIG. 12 shows the system as viewed from the rear. FIGS. 13 to 37 are views of opening and closing modes of the lens shutter system. FIGS. 13, 16, and 23 are views taken in the direction of an arrow B of FIG. 11. FIGS. 14, 17, 19, 21, 24, 26, 28, 30, 32, 34, and 36 are views taken in the direction of an arrow C of FIG. 11. FIGS. 15, 18, 20, 22, 25, 27, 29, 31, 33, 35, and 37 are sectional views of the lens shutter system in the various opening and closing modes at the line I—I of FIG. 11. FIGS. 13 to 15 show the system in initial full-closing mode. FIGS. 16 to 18 show the system in full-closing mode after an aperture is set. FIGS. 19 and 20 show the system when the shutter opening operation is started. FIGS. 21 and 22 show the system in shutter semi-opening mode. FIGS. 23 to 25 show the system in shutter full-opening mode. FIGS. 26 and 27 show the system in shutter semi-closing mode. FIGS. 28 and 29 show the system in just-before-closing mode. FIGS. 30 and 31 show the system in shutter full-closing mode. FIGS. 32 and 33 show the system in charge mode while the shutter is fully closed.

Figure 34:
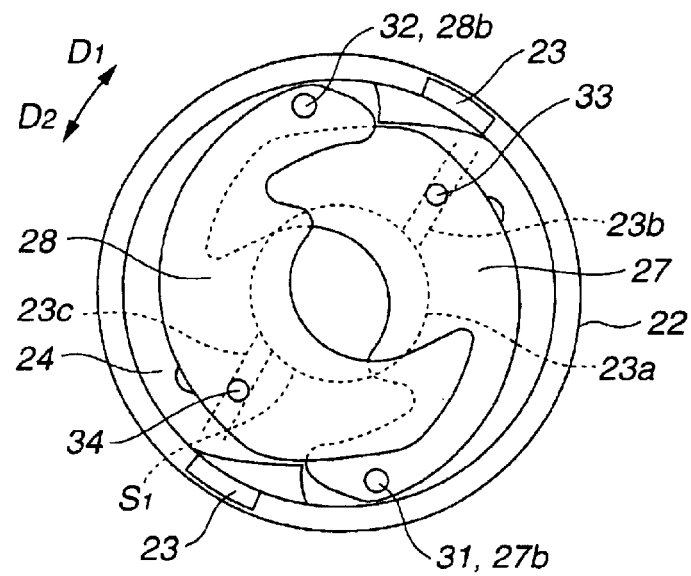
FIG. 34 is a view of the lens shutter system of FIG. 9 taken in the direction of the arrow C of FIG. 11, the system being in set-aperture forming mode of the opening and closing operation.
Figure 35:
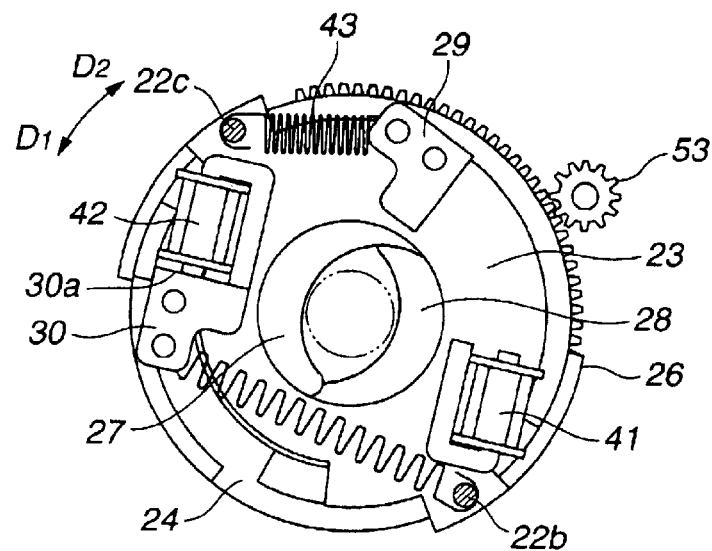
FIG. 35 is a sectional view of the lens shutter system of FIG. 9 at the line I—I of FIG. 11, the system being in the set-aperture forming mode of the opening and closing operation.
Figure 36:
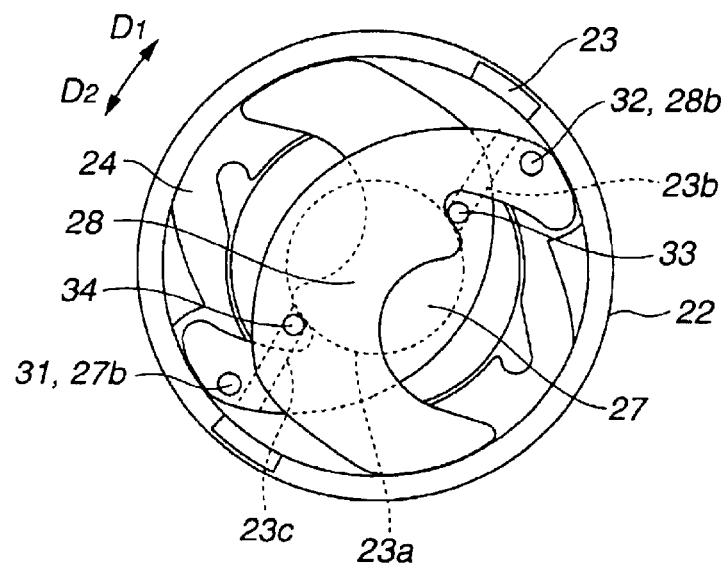
FIG. 36 is a view of the lens shutter system of FIG. 9 taken in the direction of the arrow C of FIG. 11, the system being in the full-closing mode of the opening and closing operation.
Figure 37:
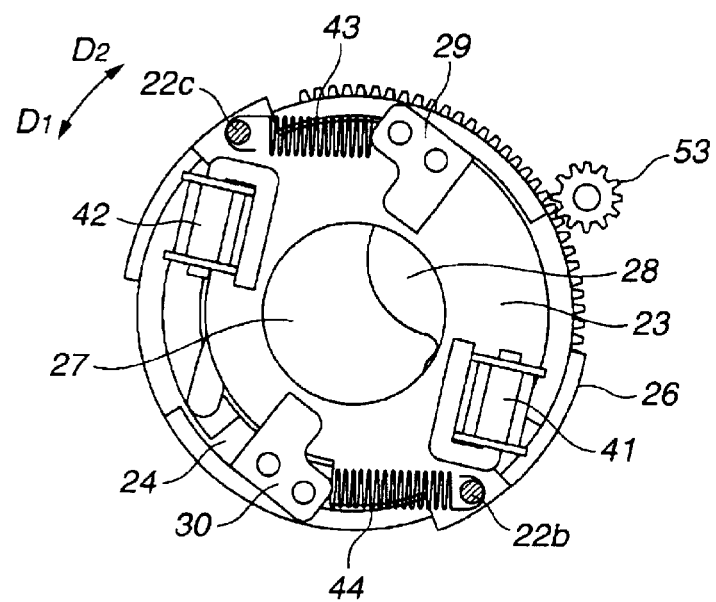
FIG. 37 is a sectional view of the lens shutter system of FIG. 9 at the line I—I in FIG. 11, the system being in the full-closing mode of the opening and closing operation.

FIGS. 34 and 35 show the system in set-aperture forming mode in which a predetermined aperture is formed. FIGS. 36 and 37 show the system in shutter full-closing mode just after the set aperture is released.

According to the present embodiment, a lens shutter system 21 mainly comprises a base plate 22, an opening ring 23 serving as a first rotation drive member, a closing ring 24 serving as a second rotation drive member, shutter blades 27 and 28, a blade retaining sheet 25, an aperture ring 26, and a drive motor 51 serving as a stepping motor. The drive motor 51 connects to a gear box 52.

The base plate 22 is fixed to a camera body (not shown). The base plate 22 has an opening 22a at the center. A shutter-opening electromagnet 41 and a shutter-closing electromagnet 42 are attached to the front surface of the plate. The electromagnets 41 and 42 are clapper type (attraction type). Further, drive pins 22b and 22c are arranged so as to stand. An opening spring 43 and a closing spring 44 hook up the drive pins 22b and 22c, respectively. The attachment positions of the electromagnets 41 and 42 can be subjected to fine adjustment. In the shutter closing mode, the electromagnets 41 and 42 are subjected to fine adjustment so as to come into tight contact with attracted surfaces 29a and 30a of iron pieces 29 and 30 of the opening ring 23 and the closing ring 24, which will be described later, in the shutter closing mode.

The opening ring 23 is supported so as to rotate about the optical axis O with respect to the camera body (not shown). The opening ring 23 has an opening 23a at the center. The opening ring 23 has the iron piece 29, which is made of a magnetic material and has the surface 29a to be attracted, on the rear surface and has guide grooves 23b and 23c on the front surface. The opening ring 23 has protrusions protruding from the outer periphery. Each protrusion has contact surfaces 23d and 23e as both the side surfaces thereof, each side surface being perpendicular to the circumferential direction. One end of the opening spring 43 hooks up the opening ring 23. In the charge mode of the opening spring 43, the opening ring 23 is rotated and forced in the direction D1 (clockwise as viewed from the front) by pulling.

The closing ring 24 has a fitting hole 24a in which the outer periphery of the opening ring 23 is rotatably fitted. The closing ring 24 is rotatably supported by the opening ring 23. The closing ring 24: the iron piece 30, which is made of a magnetic material and has the surface 30a to be attracted, on the rear surface contact surfaces 24b-and 24c provided in the direction of the rear surface thereof; and drive pins 31 and 32 protruding in parallel to the optical axis O on the front surface thereof. One end of the closing spring 44 hooks up the closing ring 24. In the charge mode of the closing spring 44, the closing ring 24 is rotated and forced in the direction D1 (clockwise as viewed from the front) by pulling.

The shutter blade 27 has an aperture edge segment 27a constituting the edge of a shutter aperture, a pin hole 27b about which first pivot is performed and in which the drive pin 31 is rotatably fitted, and a drive pin 33 about which second pivot is performed and which is rotatably and slidably fitted in the guide groove 23b. The shutter blade 28 has an aperture edge segment 28a constituting the edge of the shutter aperture, a pin hole 28b about which first pivot is performed and in which the drive pin 32 is rotatably fitted, and a drive pin 34 about which second pivot is performed and which is rotatably and slidably fitted in the guide groove 23c. The shutter blade 27 is driven by the opening ring 23 via the drive pin 31 and the guide groove 23b. The shutter blade 28 is driven by the closing ring 24 via the drive pin 32 and the guide groove 23c. The shutter blades are rotated about the optical axis O so as to open and close a shutter.

The blade retaining sheet 25 restricts the movement of the shutter blades 27 and 28 along the optical axis O. The sheet 25 has a shutter opening 25a at the center. The drive pins 31 and 32 are fitted in two pine holes 25b to attach the sheet 25 to the closing ring 24, so that the sheet 25 is rotated with the closing ring 24 in one piece.

The aperture ring 26 is rotatably supported by the camera body (not shown). The aperture ring 26 has an opening 26a at the center, a gear 26c on a part of the outer periphery thereof, and contact surfaces 26b as one side surfaces of respective protrusions. Each protrusion protrudes on the outer periphery so as to extend from the rear surface. The surfaces 26b are perpendicular to the circumferential direction. The aperture ring 26 has seven pins 35 protruding from the front surface along the optical axis O. The pins 35 pivotably support aperture blades (not shown). When the drive motor 51 rotates the aperture ring 26 by a predetermined angle prior to opening and closing the shutter, the aperture blades are driven to form an aperture (not shown) based on a set F number.

The shutter control operation for opening and closing the shutter in the lens shutter system 21 with the above structure according to the second embodiment will now be described.

In the initial mode of the present shutter control operation, as shown in FIGS. 13 to 15, the aperture ring 26 is fully rotated in the direction D2 (counterclockwise: in FIG. 15, clockwise). In this mode, the contact surfaces 26b of the aperture ring 26 press against the respective contact surfaces 23e of the opening ring 23. The contact surfaces 23d of the opening ring 23 press against the respective contact surfaces 24c of the closing ring 24. The three rings 26, 23, and 24 are rotated so that the attracted surfaces 29a and 30a of the respective iron pieces 29 and 30 are come into contact with respective attracting surfaces 41a and 42a of the electromagnets 41 and 42 (FIG. 15). The closing spring 44 and the opening spring 43 are held in the charge mode. The aperture blades are held so as to form a minimum aperture or held in full-closing mode. This mode is held by cogging torque of the motor.

The following shutter opening and closing operation for exposure upon photographing is started from the above initial mode. In other words, upon starting the shutter opening and closing operation, if the three rings 26, 23, and 24 are held in the mode shown in FIG. 15, the electromagnets 41 and 42 are energized to attract the iron pieces 29 and 30, respectively. For the attraction of the iron pieces 29 and 30, if a gap occurs due to vibration between each of the iron pieces 29 and 30 and each of the electromagnets 41 and 42 in standby mode, the contact surfaces 26b of the aperture ring 26 press against the opening ring 23 due to the foregoing initial rotation of the aperture ring 26 in the direction D2, thus further pushing the closing ring 24. Therefore, each of the iron pieces 29 and 30 is held so as not to have a gap between the attracted surface thereof and the corresponding electromagnet. The iron pieces 29 and 30 are certainly attracted to the electromagnets 41 and 42, respectively.

When the shutter full-opening operation is performed, the aperture ring 26 is rotated in the direction D1 (clockwise) to set the aperture blades (not shown) on the basis of a set F number (FIG. 16).

The shutter blades 27 and 28 are held in closing mode (FIG. 17). The electromagnets 41 and 42 are held in attraction mode (FIG. 18).

When the opening electromagnet 41 is de-energized, the magnetic force of the electromagnet 41 is lost to release the iron piece 29. Thus, the opening ring 23 is rotated in the direction D1 by the pulling force of the opening spring 43 (FIG. 20). Due to the rotation of the opening ring 23, the drive pins 33 and 34 of the respective shutter blades 27 and 28 are pressed while moving in the respective guide grooves 23b and 23c, namely, moving relative to the guide grooves 23b and 23c. Consequently, the shutter blades 27 and 28 pivot about the drive pins 31 and 32 of the closing ring 24 in the direction D1, respectively, thus starting the opening operation (FIG. 19).

When the opening ring 23 further rotates in the direction D1, the shutter blades 27 and 28 continue the above opening operation. After semi-opening mode (FIG. 21), the contact surfaces 23e of the opening ring 23 are come into contact with the contact surfaces 26b of the aperture ring 26, so that the opening ring 23 is stopped. In this stop mode, the shutter blades 27 and 28 form a full aperture using the aperture edge segments 27a and 28a (FIGS. 23 and 24). FIG. 25 shows separation of the iron piece 29 and the opening electromagnet 41 in the shutter full-opening mode.

When the closing electromagnet 42 is de-energized after a predetermined elapsed time for shutter opening, the magnetic force of the electromagnet 42 is lost to separate the iron piece 30 from the electromagnet 42, so that the closing ring 24 is rotated in the direction D1 by the pulling force of the closing spring 44 (FIG. 27). This rotation shits the drive pins 31 and 32 of the closing ring 24, thus pivoting the shutter blades 27 and 28 about the drive pins 33 and 34 in the direction D1, respectively. Simultaneously, the drive pins 33 and 34 move in the guide grooves 23b and 23c, respectively. In other words, while the drive pins 33 and 34 are moving relative to the guide grooves 23b and 23c, the shutter closing operation is started (FIG. 26).

Further, the rotation of the closing ring 24 in the direction D1 is continued, the mode shifted to the mode shown in FIGS. 28 and 29, and after that, the contact surfaces 24c of the closing ring 24 are come into contact with the respective contact surfaces 23d of the opening ring 23. Thus, the closing ring 24 is stopped, resulting in the shutter full-closing mode (FIGS. 30 and 31).

After that, in the full-closing mode shown in FIGS. 30 and 31, the drive motor 51 is driven to rotate the aperture ring 26 in the direction D2. Consequently, the aperture ring 26 presses against the opening ring 23 and the opening ring 23 presses against the closing ring 24. Thus, the rings 23 and 24 are rotated in the direction D2, resulting in the initial mode shown in FIGS. 13 and 14. Upon rotation, since the opening ring 23 and the closing ring 24 are rotated so that they are not relative to each other, the shutter blades 27 and 28 are rotated while being held in the closing mode. In the initial mode, as shown in FIG. 15, the above rings are rotated so that the attracted surfaces 29a and 30a of the iron pieces 29 and 30 are come into contact with the attracting surfaces 41a and 42a of the electromagnets 41 and 42, respectively. The closing spring 44 and the opening spring 43 are held in the charge mode.

The operation for forming a predetermined shutter aperture smaller than the full aperture will now be described. In the initial mode shown in FIG. 13, the electromagnets 41 and 42 are energized to attract the iron pieces 29 and 30, respectively. The sequence of steps up to the energization is the same as that of the shutter full-closing operation.

First, the aperture ring 26 is rotated in the direction D1 to set the aperture blades (not shown.) so as to form a predetermined aperture based on a set F number. In the rotation of the aperture ring 26, the shutter closing mode is held as shown in FIGS. 32 and 33.

When the opening electromagnet 41 is de-energized, the opening ring 23 rotates in the direction D1 by the pulling force of the opening spring 43, 50 that the contact surfaces 23e of the opening ring 23 are come into contact with the respective contact surfaces 26b of the aperture ring 26. Thus, the opening ring 23 is stopped. Due to the rotation of the opening ring 23, the drive pins 33 and 34 of the shutter blades 27 and 28 are pressed and moved in the guide grooves 23b and 23c. Thus, the shutter blades 27 and 28 pivot about the respective drive pins 31 and 32 of the closing ring 24 in the direction D1 up to respective predetermined shutter-opening positions (FIGS. 34 and 35). In this mode, the aperture formed by the shutter blades 27 and 28 is slightly larger than an aperture S1 formed by the aperture blades (not shown).

After a predetermined shutter elapsed time, the closing electromagnet 42 is de-energized. Thus, the closing ring 24 rotates in the direction D1 by the pulling force of the closing spring 44. Consequently, the contact surfaces 24c of the closing ring 24 are come into contact with the respective contact surfaces 23d of the opening ring 23, thus stopping the closing ring 24. The rotation of the closing ring 24 shifts the drive pins 31 and 32, thus pivoting the shutter blades 27 and 28 about the respective drive pins 33 and 34 in the direction D1, resulting in the shutter full-closing mode (FIGS. 36 and 37).

In the shutter full-closing mode, when the aperture ring 26 is rotated in the direction D2, the opening ring 23 and the closing ring 24 are simultaneously rotated in the direction D2. The shutter blades 27 and 28 are returned to the initial mode shown in FIGS. 13 and 14 while being closed. This operation is the same as that of the foregoing shutter full-opening operation.

In the above-mentioned lens shutter system 21 according to the second embodiment, the shutter is opened during the transition from the shutter opening operation to the shutter closing operation in a manner similar to the lens shutter system 1 according to the first embodiment. It is unnecessary to reverse the direction of rotation of the opening and closing rings 23 and 24. Thus, the opening and closing operation can be performed at high shutter speed. Particularly, according to the present embodiment, the drive pins 33 and 34 about which the shutter blades 27 and 28 pivot in the closing operation are close to the respective centers of gravity of the shutter blades in terms of the structure of the blade. Therefore, time required for the transition from the opening operation to the closing operation can be reduced. Advantageously, shutter speed can be further increased.

According to the second embodiment, since the lens shutter system 21 includes the two shutter blades, the aperture in the semi-opening mode has a substantially elliptical shape. In the opening and closing operation, the shutter is opened and then closed while the aperture is being rotated. Accordingly, the influence by the shape of the aperture is smaller than that of a conventional lens shutter system having shutter blades which merely perform reciprocating rotation.

According to the second embodiment, the lens shutter system 21 can be driven by one drive motor 51. Since it is unnecessary to use a clutch, the structure is simplified.

In the lens shutter system 21 according to the second embodiment, the aperture blades (not shown) are separated from the shutter blades 27 and 28. In the same way as the first embodiment, the aperture function is given to the shutter blades and the shutter blades can also be used as aperture blades. In this case, the aperture ring 26 merely has a function of charging the opening and closing springs and controlling the respective stop positions of the opening and closing rings.

In the lens shutter system 21 according to the second embodiment, the stop positions of the shutter blades vary depending on the aperture size. The shutter blades can also be moved in only the full-opening operation. In this case, in the full-opening mode, the contact surfaces 23e of the opening ring 23 are come into contact with the contact surfaces 24b of the closing ring 24, so that the speed of the closing ring 24 can be increased in the transition from the full-opening mode to the closing mode.

In the lens shutter system 21 according to the second embodiment, the shutter blades are charged by rotating the aperture ring. A separate charge mechanism can also be used independently of the aperture ring mechanism.

In the lens shutter system 21 of the second embodiment, when the orientation of each of the attracting surfaces of the electromagnets 41 and 42 is changed, the positions of the opening and closing rings can be inverted.

In the lens shutter system according to the first or second embodiment, the inner and outer drive rings or the opening and closing rings are mechanically come into contact with each other in the shutter opening and closing operation, thus stopping the rings. When a sensor for detecting the contact or detecting that each ring reaches a contact-equivalent position is provided for the system to perform the following operation, more effective control can be performed.

In other words, the difference between the conventional shutter system and the shutter system of the present invention is as follows.

When the pivot speed of each shutter blade is expressed using a velocity vector, the magnitude (length) of pivot speed is applied to a line perpendicular to the plane of pivot of the shutter blade and the direction of pivot of the shutter blade can be set to the direction of the vector on the line. In the conventional shutter system, since the direction of movement of the shutter blades in the opening operation is opposite to that in the closing operation, the vector in the opening operation is opposite to that in the closing operation. The shutter system of the present invention is characterized in that the velocity vector in the opening operation of the shutter blades is the same as that in the closing operation. Further, in other words, the lens shutter system having shutter blades is constructed so that the velocity vector of each shutter blade in the opening operation of the shutter blades has the same direction as that of each shutter blade in the closing operation of the shutter blades.

Specifically, the realization of the higher-speed operation for opening and closing the lens shutter according to the present invention depends on a reduction in time required for the transition from the opening operation to the closing operation. In the conventional mechanism for reciprocating shutter blades, the blades which are moving are temporarily stopped and are then moved in the opposite direction. Thus, increasing the speed of the operation is restricted. However, in the system according to the present invention, the drive unit does not reciprocate and the direction of pivot of each blade about the center of gravity in the opening operation is not different from that in the closing operation. Consequently, the transition from the opening operation to the closing operation can be performed rapidly. In addition, in the conventional mechanism for reciprocating shutter blades, when the speed of the blades is increased, it is hard to reverse the direction of movement of the blades. Accordingly, the speed of the operation is not much increased in total. In the system according to the present invention, load resistance upon reverse is small. Thus, the speed of the shutter blades can be increased.

According to another conventional proposal, in order to increase the speed of the shutter opening and closing operation, blades to be opened are separated from blades to be closed. For this type of proposal, many various proposals have been made. Since the direction of rotation of components is not reversed, it is effective at increasing the speed. However, many blades are needed and the mechanism is complicated. In the system of the present invention, advantageously, the high-speed operation can be realized using the shutter blades which are small in number. The present system can be arranged in a small space.

As mentioned above, in the lens shutter system according to the first and second embodiments, the direction of pivot of the shutter blades is not reversed in the shutter opening and closing operation and the blades are pivoted in one direction, so that the shutter opening and closing operation can be realized at high speed.

A camera capable of mounting a macro-lens adapter according to a third embodiment will now be described with reference to the drawings.

Figure 38A:
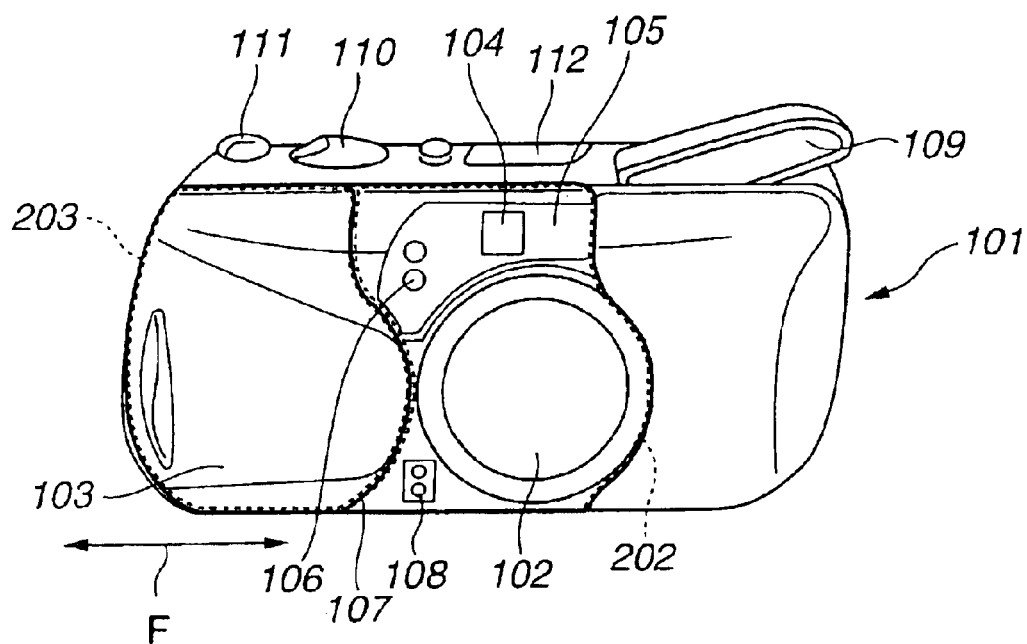
FIG. 38A is an external view of a compact camera with a barrier as an example of a camera capable of mounting a macro-lens adapter according to a third embodiment of the present invention.

FIG. 38A shows the appearance of a compact camera with a barrier as an example of the camera capable of mounting the macro-lens adapter according to the third embodiment.

On the front surface of a camera body 101 of the camera, a silver-halide-film taking lens (taking lens) 102, a lens barrier 103, a viewfinder window 104, a photometric photo-receiving unit (photometry window) 105, an AF photo-transmitter unit (AF window) 106, a macro-lens adapter switch 107, and a photo-reflector 108 are arranged. A CPU 113 for controlling the whole camera and a focal-length adjustment mechanism 114 are built in the camera body 101. The CPU 113 also serves as operating-mode setting means for setting the operating mode of the camera in accordance with the position of the barrier. The focal-length adjustment mechanism 114 serves as focal-length adjustment means for adjusting the focal length of the taking lens 102.

The taking lens 102 forms an image of a subject on a film (not shown) in the camera. Upon photographing, the taking lens 102 is driven so as to change the focal length through the focal-length adjustment mechanism 114 in the camera. Upon macro photographing, a macro-lens adapter, which will be described later, is attached to the taking lens 102. A broken line 202 in FIG. 38A denotes a macro lens 202 of the macro-lens adapter.

The lens barrier 103 protects the surface of the taking lens 102. The lens barrier 103 is slidable in the direction of an arrow F of FIG. 38A. When the lens barrier 103 is slid in the direction of opening, the taking lens 102 is exposed. Further, the sliding operation turns a power source of the camera on, thus allowing the camera to enter operating mode, namely, photographable mode. On the other hand, when the lens barrier 103 is slid in the direction of closing, the taking lens 102 is covered with the barrier. This sliding operation turns the power source of the camera off, thus allowing the camera to enter non-operating mode, namely, standby mode. A broken line 203 in FIG. 38A denotes a lens barrier 203 of the macro-lens adapter, which will be described in detail later.

The viewfinder window 104 is an objective window through which a photographer confirms the state of a subject or framing upon photographing.

The metering window 105 has a light-metering sensor (not shown) therein. The light-metering sensor receives light from a photographing scene. On the basis of a result of the reception by the light-metering sensor, the amount of light of the subject is measured. On the basis of a result of the measurement of the amount of light, the CPU 113 in the camera determines an F number and shutter speed upon exposure and also determines whether flash firing is needed.

The AF window 106 has a photo-transmitter element (not shown) therein. The photo-transmitter emits light to the subject. The light emitted from the photo-transmitter element is reflected by the subject. The camera receives the reflected light. On the basis of a result of the reception of the light reflected by the subject, the CPU 113 in the camera calculates the distance between the camera and the subject, namely, the subject distance.

Figure 38B:
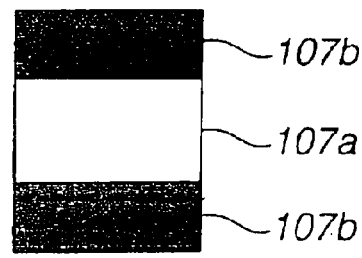
FIG. 38B is an enlarged view of a macro-lens adapter switch as observed from the right side of the camera of FIG. 38A.

The macro-lens adapter switch 107 detects whether the macro-lens adapter is attached to the camera body 101. The macro-lens adapter will be described in detail later. FIG. 38B is an enlarged view of the macro-lens adapter switch 107 as viewed from the right side surface of the camera. The macro-lens adapter switch 107 has a switch segment 107*a* to be electrically connected to a switch main segment 107*b* (black portions in FIG. 38B). When it is determined using a macro-lens adapter-switch contact, which will be described later, whether the switch segment 107*a* is turned on, the camera detects that the macro-lens adapter is attached thereto.

The photo-reflector 108 serves as a photo-transmitter-receiver element for transmitting light to an object and receiving light reflected by the object. The photo-reflector 108 detects the opening or closing state of the lens barrier provided for the macro-lens adapter.

On the top surface of the camera body 101, a flash firing unit 109, a release button 110, a zoom switch 111, and a liquid crystal display (LCD) 112 serving as distance information display means are arranged.

The flash firing unit 109 has an arc tube therein. The arc tube built therein is controlled so as to emit light upon exposure as necessary.

The release button 110 is used for operating a first release switch (1R SW) and a second release switch (2R SW) constituting a two-segmented depression type switch. When the release button 110 is depressed by half, the 1R SW is turned on to start the exposure preparation operation such as calculation of a subject distance (distance measurement) and measurement of the amount of light (light metering). When the release button 110 is fully depressed, the 2R SW is turned on to start the exposure operation. Thus, the image of the subject is recorded on the film (not shown).

The zoom switch 111 controls a zooming mechanism (not shown) in the camera to zoom the taking lens 102. The zoom switch 111 can be controlled in the direction of any of TELE mode and WIDE mode. The zoom switch 111 is controlled in the direction of the TELE mode or the WIDE mode to start the zooming of the taking lens 102. Thus, telephotography or wide-angle photography can be performed.

The LCD 112 displays the subject distance upon macro photography, which will be described later, and further displays the frame number of the film.

Figure 39A:
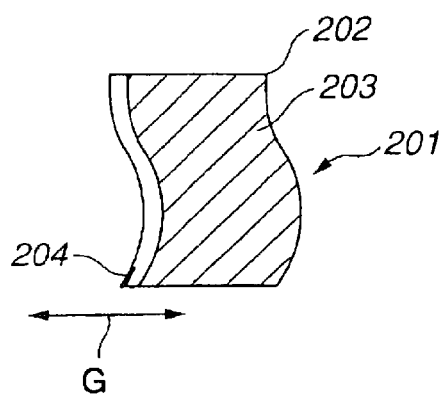
FIG. 39A is an external view of the macro-lens adapter when the lens barrier of the camera of FIG. 38A is closed.
Figure 39B:
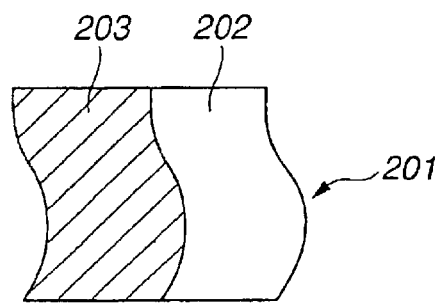
FIG. 39B is an external view of the macro-lens adapter when the lens barrier of the camera of FIG. 38A is opened.

FIGS. 39A and 39B show the appearance of the macro-lens adapter according to the third embodiment. FIG. 39A shows the state of the macro-lens adapter in which the lens barrier is closed. FIG. 39B shows the state of the macro-lens adapter in which the lens barrier is opened.

In other words, a macro-lens adapter 201 comprises the macro lens 202 (hatched portion in FIGS. 39A and 39B), the lens barrier 203, and a macro-lens adapter-switch contact 204.

The macro lens 202 is designed for macro photography.

The lens barrier 203 protects the surface of the macro lens 202. The lens barrier 203 corresponds to a barrier disclosed in the appended claims. The lens barrier 203 is slidable in the direction of an arrow G of FIG. 39A. When the lens barrier 203 is slid in the direction of opening, the macro lens 202 is exposed. On the other hand, when the lens barrier 203 is slid in the direction of closing, the macro lens 202 is covered with the barrier, thus protecting the surface of the macro lens 202.

The photo-reflector 108, provided for the camera body 101, detects whether the lens barrier 203 is opened or closed. In other words, when the photo-reflector 108 emits light, the emitted light is reflected by the rear surface of the lens barrier 203 so long as the lens barrier 203 is closed. On the other hand, when the photo-reflector 108 emits light, the emitted light is not reflected by the rear surface of the lens barrier 203 so long as the lens barrier is opened. Therefore, the presence or absence of light reflected by the lens barrier 203 is detected using the photo-reflector 108, thus detecting the opening or closing state of the lens barrier 203.

Further, the opening or closing state of the lens barrier 203 is synchronized with the turn-on/off of the camera body 101. When the lens barrier 203 is opened, the camera body 101 is turned on, thus entering the photographable mode. On the other hand, when the lens barrier 203 is closed, the camera body 101 is turned off, thus entering the standby mode. Consequently, the camera body 101 can be turned on or off without opening or closing the lens barrier 103 of the camera body 101. In addition, the lens barrier 203 protects the surface of the macro lens 202. Accordingly, it is unnecessary to carry the macro lens adapter 201 separately from the camera body 101.

The macro-lens adapter-switch contact 204 is provided for the macro lens 202. The contact 204 turns the foregoing macro-lens adapter switch on. When the macro-lens adapter 201 is attached to the camera body 101, the macro-lens adapter-switch contact 204 is electrically connected to the switch segment 107*a* of the macro-lens adapter switch 107. Thus, the camera detects the attachment of the macro-lens adapter 201.

Figure 40A:
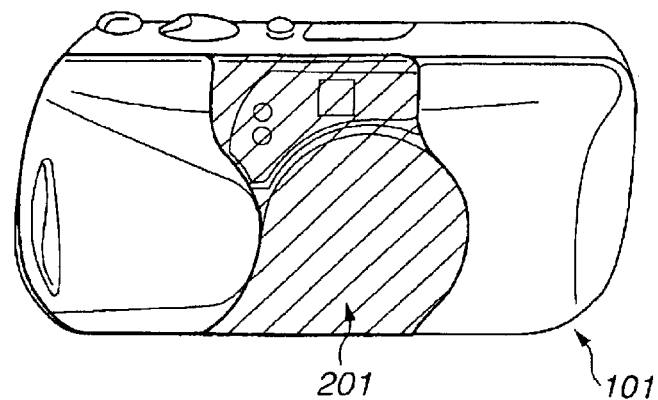
FIG. 40A is an external view of the camera of 38A, the camera mounting the macro-lens adapter with a lens barrier which is closed.
Figure 40B:
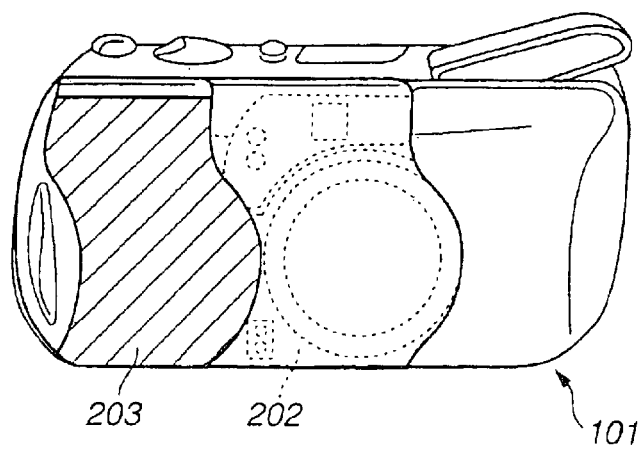
FIG. 40B is an external view of the camera of 38A, the camera mounting the macro-lens adapter with the lens barrier which is opened.

FIGS. 40A and 40B show the appearance of the camera to which the macro-lens adapter is attached. FIG. 40A shows the state of the camera mounting the macro-lens adapter 201 in which the lens barrier 203 is closed. FIG. 40B shows the state of the camera mounting the macro-lens adapter 201 in which the lens barrier 203 is opened.

When the macro-lens adapter 201 is attached to the camera body 101, the taking lens 102 of the camera body 101 is controlled so that the focal length of the taking lens 102 is the minimum, namely, the taking lens 102 is in collapsing mode. Consequently, the lens barrier 203 can be closed as shown in FIG. 40A. On the other hand, when the lens barrier 203 is opened as shown in FIG. 40B, the taking lens 102 is not driven and controlled from the collapsed position.

Figure 41:
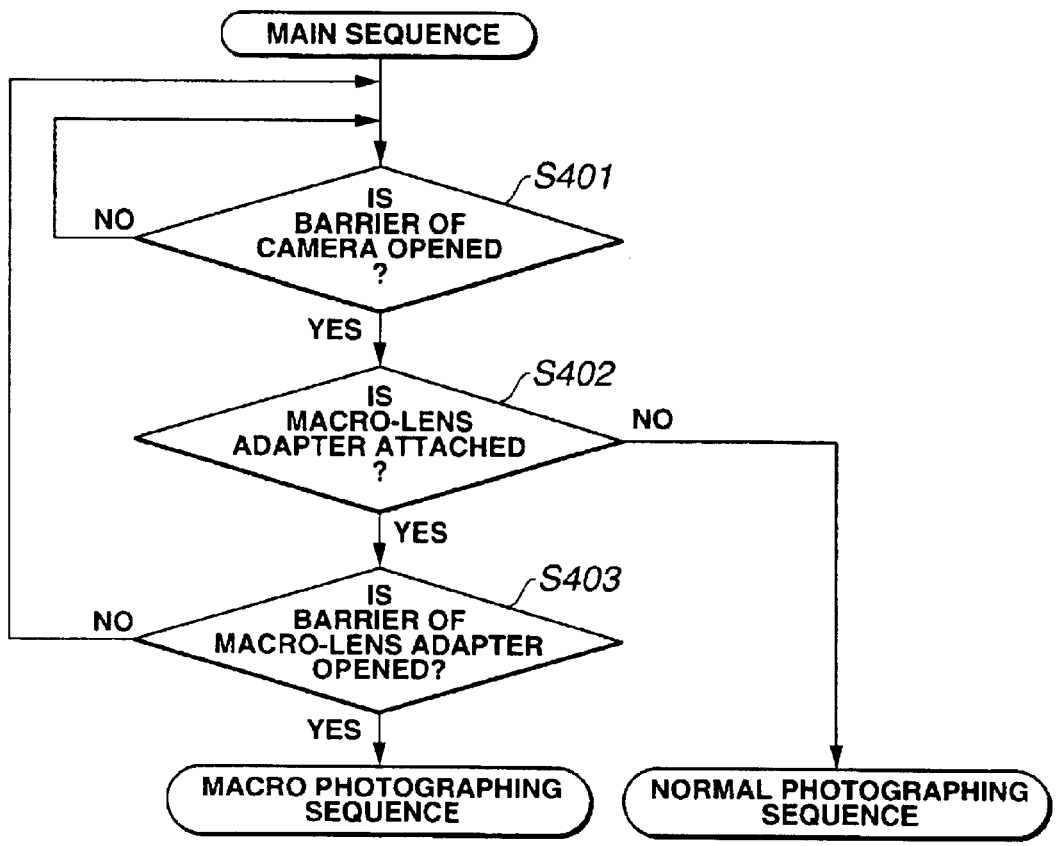
FIG. 41 is a flowchart of the control procedure of a main sequence of the camera capable of mounting the macro-lens adapter according to the third embodiment of FIG. 38A.

The operation for controlling a main sequence of the camera capable of mounting the macro-lens adapter according to the third embodiment will now be described with reference to FIG. 41.

The following sequence of the camera according to the present embodiment is controlled by the CPU 113 built in the camera. The CPU 113 includes a function of operating-mode setting means disclosed in the appended claims.

The CPU 113 determines whether the lens barrier 103 of the camera body 101 is opened (step S401). When it is determined that the lens barrier 103 is not opened, the determination of step S401 is repeated until the lens barrier 103 is opened.

On the other hand, if it is determined in step S401 that the lens barrier 103 is opened, whether the macro-lens adapter 201 is attached to the camera body 101 is determined on the basis of the state of the foregoing macro-lens adapter switch 107 (step S402). When it is determined that the macro-lens adapter 201 is not attached to the camera body 101, a normal photographing sequence, which will be described later, is controlled.

On the other hand, if it is determined in step S402 that the macro-lens adapter 201 is attached to the camera body 101, whether the lens barrier 203 of the macro-lens adapter 201 is opened is determined on the basis of an output of the photo-reflector 108 (step S403). If it is determined that the lens barrier 203 of the macro-lens adapter 201 is not opened, the camera is in the standby mode. The sequence is returned to step S401.

On the other hand, if it is determined in step S403 that the lens barrier 203 of the macro-lens adapter 201 is opened, a macro photographing sequence, which will be described hereinbelow, is controlled.

Figure 42:
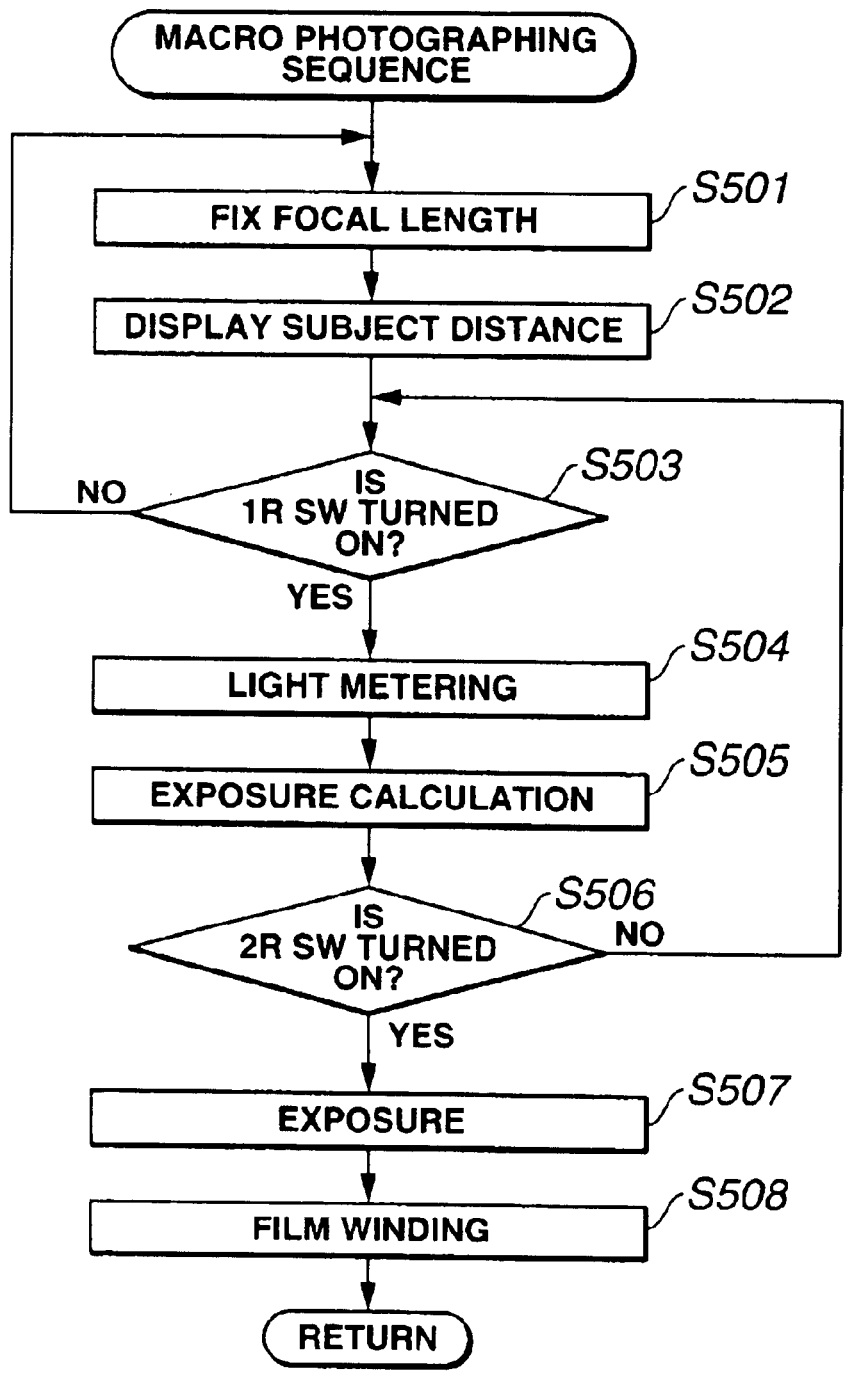
FIG. 42 is a flowchart of the control procedure of a macro photographing sequence as a subroutine which is called in the routine of the main sequence of FIG. 41.

The control of the macro photographing sequence will now be described with reference to FIG. 42.

In the foregoing main sequence, when it is determined that the control of the macro-photographing sequence is performed, the taking lens 102 of the camera body 101 is driven to a position where the focal length is the minimum. Then, the taking lens 102 is fixed on the position (step S501). The reason is that the taking lens 102 interferes with the macro lens 202 due to zooming.

Subsequently, the LCD 112 is allowed to display the current subject distance (step S502). In other words, when the macro-lens adapter 201 is attached, distance-measurement data for focusing, namely, the amount of projection of the lens is displaced from that of normal photographing. The position of the focal point of the taking lens 102 is fixed so that the displacement in the amount of projection of the lens can be corrected by setting a subject distance to an arbitrary value through the photographer. For this purpose, the LCD 112 displays the current subject distance so that the photographer can recognize the current subject distance.

Instead of the correction of the displacement in the amount of projection of the lens through the photographer, AF light-emitting conditions for the macro-lens adapter and the field of view can be changed to allow the camera to correct out-of-focusing.

Subsequently, whether the release button 110 is depressed by half to turn the 1R SW on is determined (step S503). When it is determined that the 1R SW is not turned on, the sequence is returned to step S501. On the other hand, if the turn-on of the 1R SW is detected, a light metering process of measuring the amount of light of the subject is performed (step S504). After that, on the basis of the amount of light of the subject measured by the light metering process, exposure calculation of calculating shutter speed is performed (step S505).

Subsequently, whether the release button 110 is fully depressed to turn the 2R SW on is determined (step S506). When it is determined that the 2R SW is not turned on, the sequence is returned to step S503. On the other hand, when it is determined that the 2R SW is turned on, a shutter (not shown) is driven to perform exposure (step S507). Then, a film is wound (step S508). The sequence is returned to step S401 of the flowchart of the main sequence.

Figure 43:
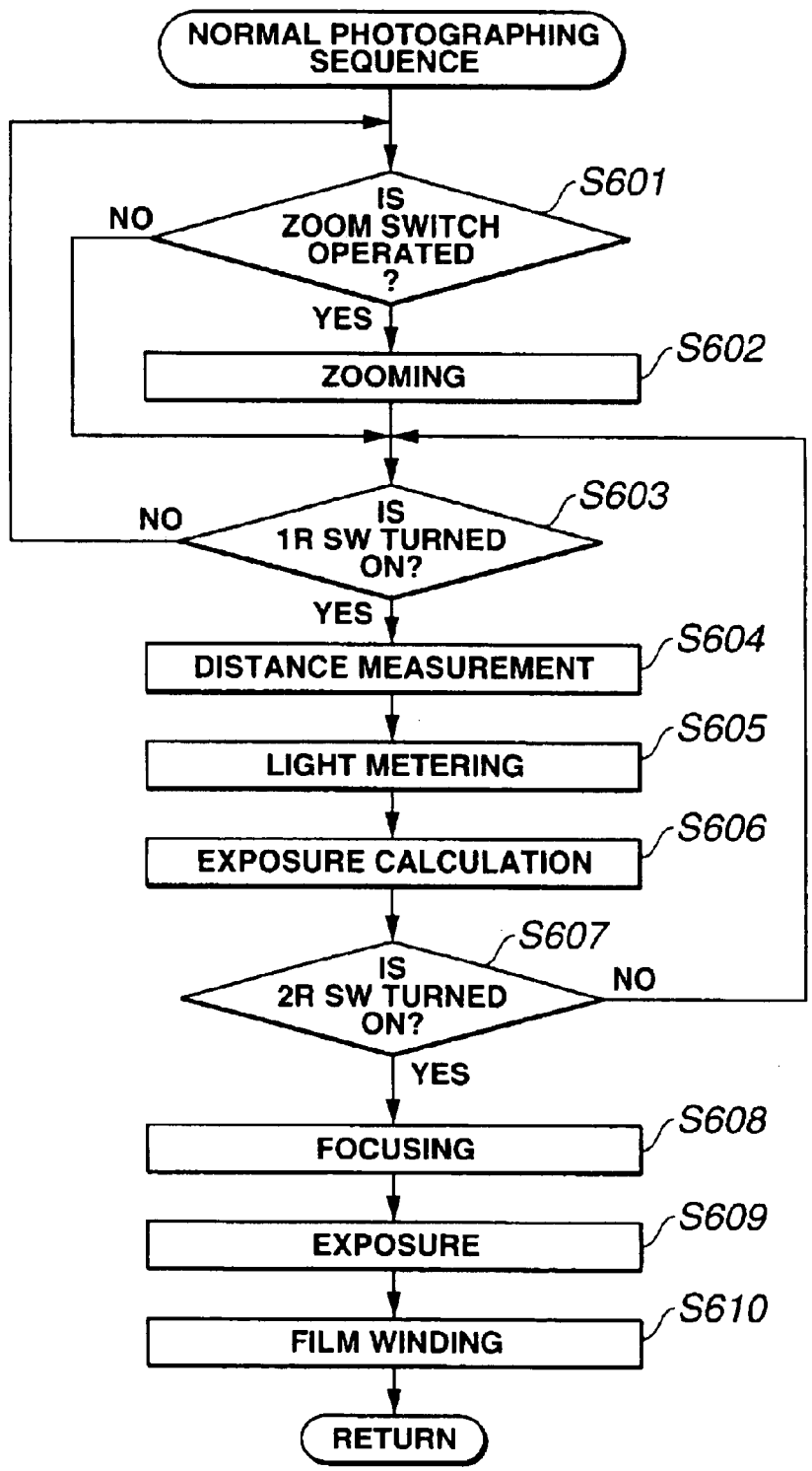
FIG. 43 is a flowchart of the control procedure of a normal photographing sequence as a subroutine which is called in the routine of the main sequence of FIG. 41.

The control of the normal photographing sequence will now be described with reference to FIG. 43. Whether the zoom switch 111 is operated in the direction of the TELE mode or the WIDE mode is determined (step S601). When it is determined that the zoom switch 111 is operated in the direction of any mode, the taking lens 102 is zoomed in accordance with the direction of operation of the zoom switch 111 (step S602). Then, the sequence proceeds to step S603. On the other hand, when it is determined that the zoom switch 111 is not operated, the sequence proceeds to step S603.

Subsequently, whether the release button 110 is depressed by half to turn the 1R SW on is determined (step S603). When it is determined that the 1R SW is not turned on, the sequence is returned to step S601. On the other hand, if it is determined that the 1R SW is turned on, a distance measuring process of calculating the subject distance is performed (step S604) and a light metering process of measuring the amount of light of the subject is performed (step S605). On the basis of the amount of light of the subject measured by the light metering process, exposure calculation of calculating shutter speed is performed (step S606).

Subsequently, whether the release button 110 is fully depressed to turn the 2R SW on is determined (step S607). When it is determined that the 2R SW is not turned on, the sequence is returned to step S602. On the other hand, if it is determined that the 2R SW is turned on, the taking lens 102 is driven to perform focusing (step S608).

Subsequently, the shutter (not shown) is driven to perform exposure (step S609). After that, a film is wound (step S610). The sequence is returned to step S401 of the flowchart of the main sequence.

As mentioned above, according to the third embodiment, the macro-lens adapter with the above mentioned structure and the camera capable of mounting the macro-lens adapter can be provided. If the macro-lens adapter is attached to the camera with the barrier, the ON/OFF operation of the camera can be easily performed. In the macro-lens adapter, the surface of the macro lens is not soiled.

A camera according to a fourth embodiment of the present invention will now be described in detail hereinbelow.

Figure 44A:
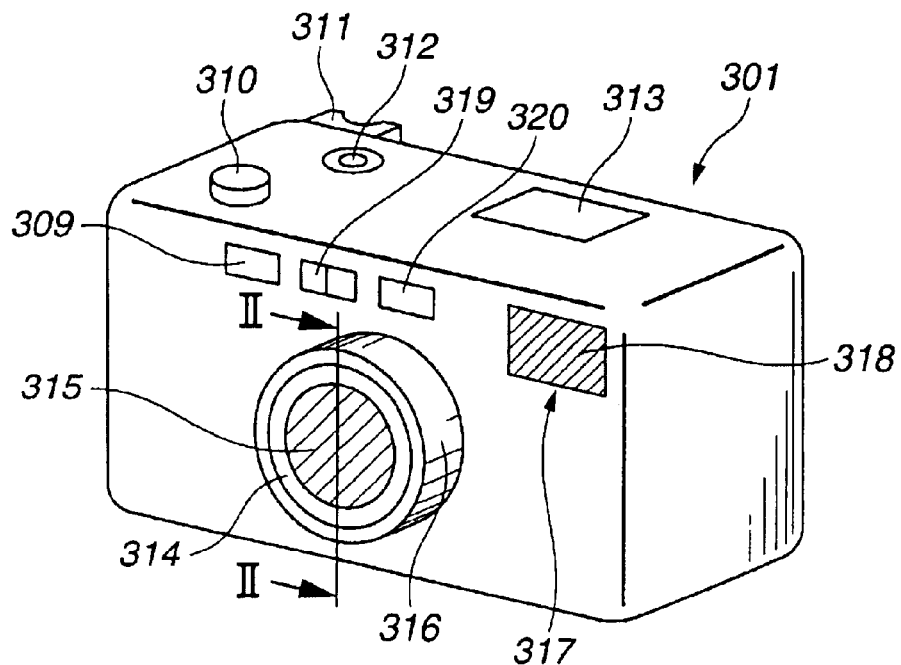
FIG. 44A is an external perspective view of a compact camera according to a fourth embodiment of the present invention, the camera being in non-photographing mode.
Figure 44B:
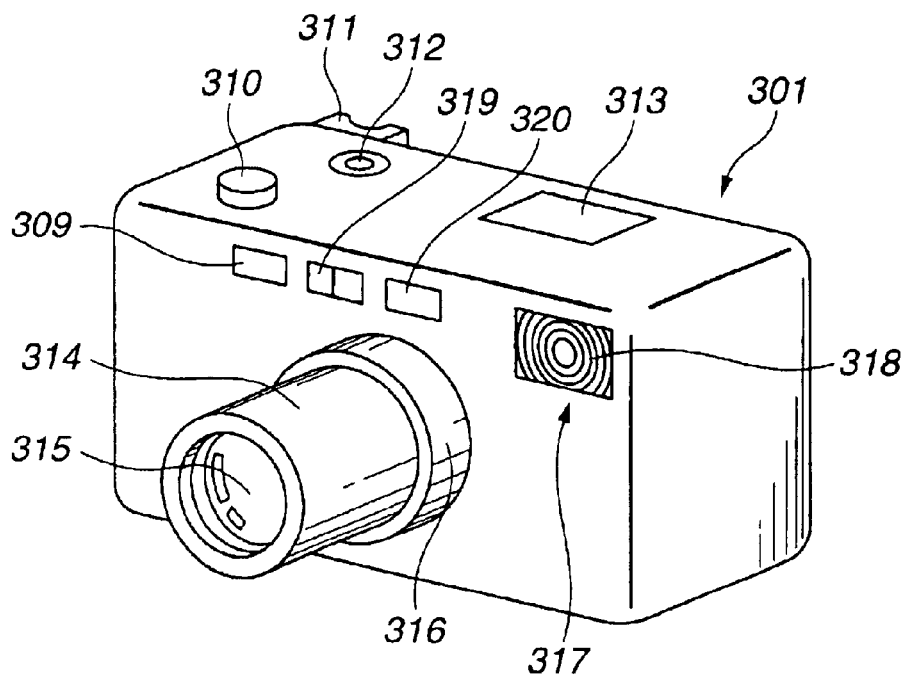
FIG. 44B is an external perspective view of the compact camera of FIG. 44A, the camera being in photographable mode.

FIGS. 44A and 44B are perspective view of a compact camera to which the fourth embodiment is applied. As shown in FIGS. 44A and 44B, a lens barrel 316 is disposed at the center of the front surface of a camera body 301. A distance measuring unit 319, a viewfinder window 320, and a light metering unit 309 are arranged above the lens barrel. A movable frame 314 is disposed in the lens barrel 316.

The movable frame 314 holds a photographing optical system including a taking lens. When moving upon photographing, the movable frame 314 can shift the photographing optical system along the optical axis of the lens. A negative LCD 315 is arranged at the end of the movable frame 314. The negative LCD 315 has transparent mode, in which light from a subject passes upon focusing or upon exposing a film or an imaging device, and nontransparent mode, in which light from the subject is blocked out at other times.

Further, a flash firing unit 317 having a flash window LCD 318 is arranged in the right upper portion on the front surface of the camera body 301. The flash window LCD 318 has transparent mode, in which flash passes upon photographing, and nontransparent mode in which the flash is cut off at other times.

A release button 310, a power SW (hereinbelow, SW means a switch) button 312, an LCD display window 313 are arranged on the top surface of the camera body 301. A zoom button 311 is arranged in the right upper portion of the rear surface of the camera body 301.

FIG. 44A shows the camera in non-photographing mode. The movable frame 314 holding the photographing optical system is received in the lens barrel 316. The negative LCD 315 is in the nontransparent mode in which light from the subject is blocked out. The flash window LCD 318 is in the nontransparent mode in which flash is cut off.

On the other hand, FIG. 44B shows the camera in the photographable mode. The movable frame 314 holding the photographing optical system is projected from the lens barrel 316 toward the subject. The negative LCD 315 is in the transparent mode in which light from the subject passes. The flash window LCD 318 is in the transparent mode in which flash is emitted.

Figure 45:
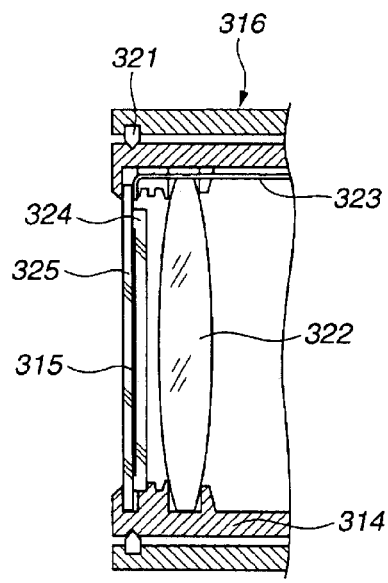
FIG. 45 is a sectional view of a lens barrel 16 of the compact camera at the line II—II of FIG. 44A.

FIG. 45 is a sectional view of the lens barrel 316 at the line II—II of FIG. 44A. In the lens barrel 316, the movable frame 314 holding a taking lens 322 is arranged so as to be movable along the optical axis of the lens. A seal member 321 for protecting against dust or blocking out light is arranged between the lens barrel 316 and the movable frame 314.

In the movable frame 314, the negative LCD 315, enclosed between a pair of glass plates 324 and 325, is arranged in front of the taking lens 322. A flexible printed electric circuit board 323 is disposed along the inner wall of the movable frame 314. The flexible printed electric circuit board 323 is electrically connected to the negative LCD 315 and is also electrically connected to an electric circuit board arranged in the camera body.

As shown in FIG. 45, the negative LCD 315 and the taking lens 322 are fixed to the same movable frame 314. Accordingly, when the taking lens 322 moves along the optical axis of the lens, the negative LCD 315 is simultaneously movable.

Figure 46:
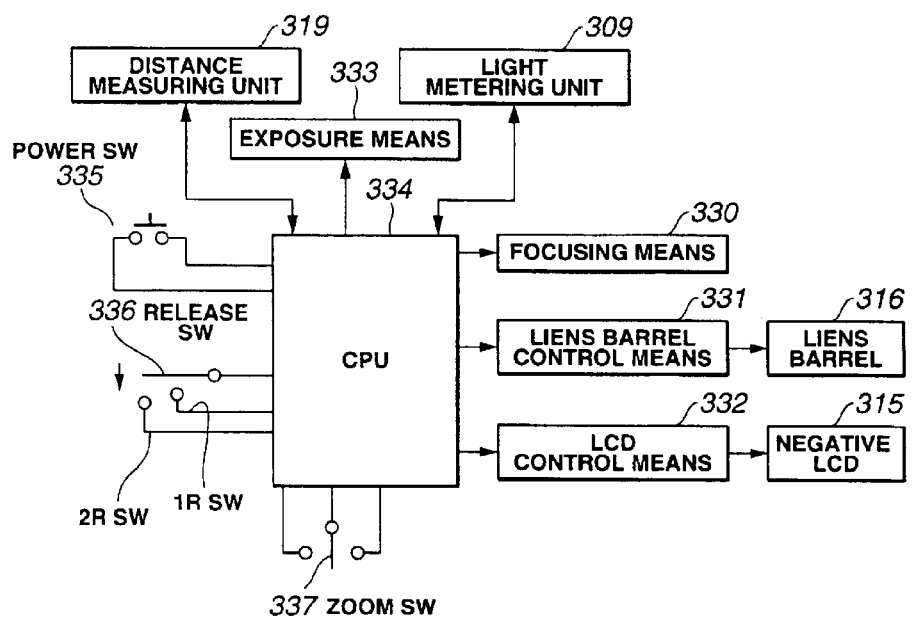
FIG. 46 is a block diagram explaining the fundamental structure of the compact camera of FIG. 44A.

FIG. 46 is a block diagram explaining the fundamental structure of the compact camera according to the fourth embodiment. A CPU 334 comprises a microcomputer to control the whole camera. The distance measuring unit 319, the light metering unit 309, exposure means 333, and focusing means 330 are connected to the CPU 334. The distance measuring unit 319 measures the distance between the camera and a subject in order to focus the subject. The light metering unit 309 measures the brightness of the subject. The exposure means 333 exposes a film or a CCD, each of which is not shown, on the basis of the brightness of the subject measured by the light metering unit 309 to form the image of the subject. The focusing means 330 performs the lens focusing operation on the basis of the subject distance obtained by the distance measuring unit 319.

Further, the lens barrel 316 is connected to the CPU 334 via lens barrel control means 331. The negative LCD 315 is also connected to the CPU 334 through LCD control means 332. As control switches, a power SW 335, a release SW 336, and a zoom SW 337 are connected to the CPU 334.

The power SW 335 turns a main power source of the camera on or off. The release SW 336 generates an instruction to start the photographing operation of the camera and comprises a first (1R) release SW and a second (2R) release SW. When the release button 310 is depressed by half, the 1R release SW is turned on. When the release button 310 is fully depressed, the 2R release SW is turned on. The turn-on is transmitted to the CPU 334, thus performing the photographing operation. When the zoom button 311 is controlled to turn the zoom SW 337 on, the turn-on is transmitted to the CPU 334, thus performing the zooming operation. Upon zooming, the movable frame 314 is moved in the direction of wide-angle mode or telephoto mode through the barrel control means 331.

Switching the negative LCD 315 between the transparent mode and the nontransparent mode is controlled by applying a predetermined voltage to the negative LCD 315 through the LCD control means 332 in accordance with an instruction generated from the CPU 334. In other words, when the predetermined voltage is applied to the negative LCD 315, the transparent mode is set. When the predetermined voltage is not applied to the negative LCD 315, the nontransparent mode is set.

Figure 47:
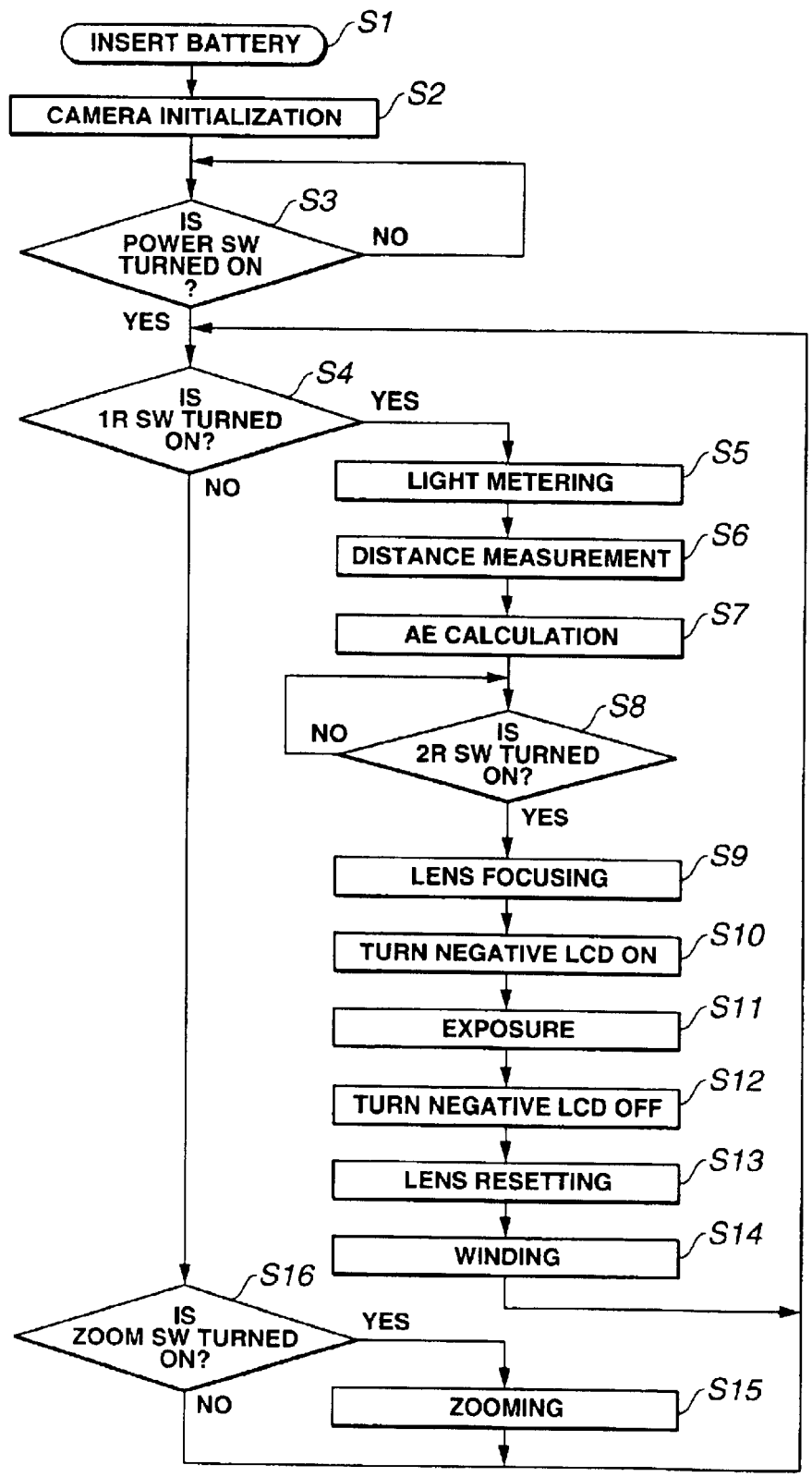
FIG. 47 is a flowchart explaining the operation of the compact camera of FIG. 44A.

FIG. 47 is a flowchart explaining the operation of the compact camera according to the fourth embodiment. When a battery (not shown) is inserted in a battery chamber in the camera body 301 (step S1), camera initialization is performed, the initialization including initialization of a RAM (not shown) in the CPU 334 and clearing of flags (step S2). Subsequently, the CPU 334 determines whether the power SW 335 is turned on (step S3). If NO, the CPU 334 is in standby mode until the power SW 335 is turned on. If YES, the CPU 334 determines whether the 1R SW is turned on (step S4). If NO, whether the zoom button 311 is operated to turn the zoom SW 337 on is determined (step S16). If YES, the zooming operation for moving the movable frame 314 of the camera along the optical axis of the lens is performed (step S15). After that, the operation is returned to step S4. If No in step S16, the operation is immediately returned to step S4.

On the other hand, if YES in step S4, the light metering operation for measuring the brightness of the subject (step S5), the distance measuring operation for measuring the subject distance for the lens focusing operation (step S6), and AE calculation of calculating exposure time on the basis of an F number (FNO), a metering value, and ISO speed (step S7) are performed in this order. Then, whether the 2R SW is turned on is determined (step S8).

If NO in step S8, the CPU is in the standby mode until the 2R SW is turned on. When the 2R SW is turned on, the lens focusing operation is performed (step S9).

Subsequently, the predetermined voltage is applied to the negative LCD 315, thus turning the LCD 315 on (transparent mode) (step S10). After that, the exposure operation as the photographing operation is performed (step S11). After the exposure operation is completed, the application of voltage to the negative LCD 315 is stopped, thus turning the LCD 315 off (nontransparent mode) (step S12). After that, the lens resetting operation (step S13) and the film winding operation (step S14) are performed. Then, the operation is returned to step S4.

As mentioned above, according to the fourth embodiment, in the exposure operation, the negative LCD 315 arranged in front of the taking lens 22 is controlled so as to be turned on (transparent mode) through control means (the CPU 334 and the LCD control means 332). Consequently, light from the subject is allowed to enter the camera through the taking lens 322, resulting in exposure. Except the exposure operation, the negative LCD 315 is controlled so as to be turned off (nontransparent mode). Thus, unnecessary light that tends to enter the lens at time except the exposure operation is cut off. In this manner, unnecessary light that enters the lens can be blocked out while a problem such as degradation of the appearance is being solved. Leaked light or excess light does not reach the film or CCD.

Upon shutter release, the negative LCD 315 shifts to the transparent mode. Accordingly, the shutter operation can be confirmed from the subject side.

Figure 48:
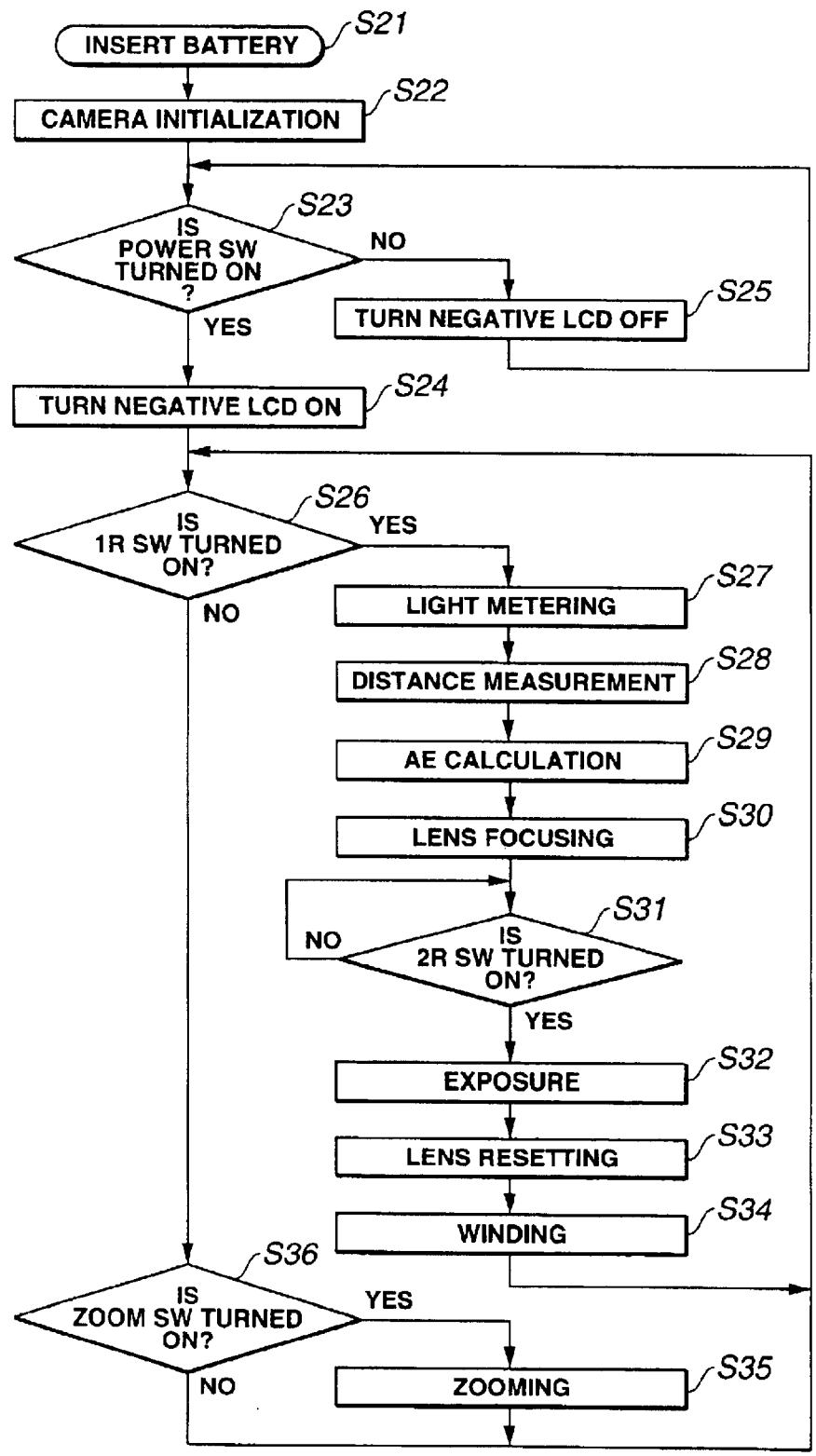
FIG. 48 is a flowchart explaining the operation of a single-lens reflex camera according to a fifth embodiment of the present invention.

The present invention can be applied to a single-lens reflex camera. The operation of a single-lens reflex camera according to a fifth embodiment of the present invention will now be described with reference to a flowchart of FIG. 48. Essential components of the camera according to the present embodiment are designated by the same reference numerals as those of the fourth embodiment.

When a battery is inserted in a battery chamber in a camera body (step S21), camera initialization is performed, the initialization including initialization of a RAM (not shown) in a CPU 334 and clearing of flags (step S22). Subsequently, the CPU 334 determines whether a power SW 335 is turned on (step S23). If NO, a voltage is not applied to a negative LCD 315, thus turning the LCD 315 off (nontransparent mode) (step S25). After that, the operation is returned to step S23. If YES in step S23, a predetermined voltage is applied to the negative LCD 315, thus turning the LCD 315 on (transparent mode) (step S24). After that, whether a 1R SW of a release SW 336 is turned on is determined (step S26). If NO, whether a zoom button 311 is operated to turn a zoom SW 337 on is determined (step S36). If YES, the zooming operation is performed (step S35). After that, the operation is returned to step S26. If NO in step S36, the operation is immediately returned to step S26.

On the other hand, if YES in step S26, the light metering operation (step S27), the distance measuring operation for the lens focusing operation (step S28), and AE calculation (step S29) are performed in this order, and lens focusing operation is performed (step S30). Then, whether a 2R SW is turned on is determined (step S31). In this instance, if NO, the CPU is in standby mode until the 2R SW is turned on. When the 2R SW is turned on, the exposure operation as the photographing operation of the camera is performed (step S32). After that, the lens resetting operation (step S33) and the film winding operation (step S34) are performed. Then, the operation is returned to step S26.

As mentioned above, according to the fifth embodiment, while the power SW 335 is turned on (especially, in the focusing operation and the exposure operation), the negative LCD 315 arrange in front of the taking lens 322 is controlled so as to be in the transparent mode through control means (the CPU 334 and LCD control means 332). Accordingly, light from a subject is allowed to enter the camera, thus realizing the focusing operation. Except photographable mode, the negative LCD 315 is controlled so as to be in the nontransparent mode. Consequently, unnecessary light that tends to enter the lens is blocked out at time except the photographable mode. In this manner, unnecessary light that enters the lens can be blocked out while a problem such as degradation of the appearance is being solved. Thus, leaked light or excess light does not reach a film or a CCD.

Upon shutter release, the negative LCD 315 shifts to the transparent mode. Accordingly, the shutter operation can be confirmed from the subject side.

As mentioned above, according to the fourth and fifth embodiments, unnecessary light that enters the lens can be blocked out while a problem such as degradation of the appearance of the camera is being solved.

The present invention is not limited to the above embodiments. Various modifications of this invention may be made without departing from the spirit and scope thereof. Further, the above embodiments contain various stages of the invention. Proper combinations of a plurality of disclosed components may produce variations of the invention.

For example, if several components are eliminated from all of the components in each embodiment, so long as problems, described in the description regarding problems to be solved by the invention, can be solved and advantages, described in the description regarding advantages of the invention, can be obtained, the structure excluding the eliminated components may be derived as a modification of the invention.

What is claimed is:

1. A lens shutter system comprising:
   a shutter blade for opening and closing an opening through which light rays for photography pass; and
   a drive member for applying a driving force to open and close the shutter blade,
   wherein the shutter blade is driven by the drive member, the shutter blade pivots about a first axis parallel to the optical axis of the light rays in one direction to perform the opening operation, and the shutter blade further pivots about a second axis parallel to the optical axis of the light rays in the same direction as the one direction to perform the closing operation, the second axis being different from the first axis.

2. The system according to claim 1, wherein the shutter blade comprises a plurality of sectors and the sectors are arranged so as to surround the light rays.

3. The system according to claim 1, wherein the first axis about which the shutter blade pivots includes a circular hole and the second axis about which the shutter blade pivots includes a long hole.

4. The system according to claim 1, wherein the first axis about which the shutter blade pivots includes a circular hole and the second axis about which the shutter blade pivots includes a pin.

5. A lens shutter system comprising:
   shutter blades serving as members for opening and closing an opening through which light rays for photography pass, each shutter blade being pivoted on the central point of first pivot and being pivoted on the central point of second pivot, each shutter blade having an edge segment constituting the edge of an aperture through which the light rays pass, the edge segment being formed between the central point of the first pivot and the central point of the second pivot, the central point of the first pivot and the central point of the second pivot being arranged in each shutter blade so as to sandwich the light rays therebetween;
   a drive member for applying a driving force to open and close the shutter blades,
   wherein the shutter blades are driven by the drive member, the shutter blades are pivoted on the respective central points of the first pivot in one direction to form the aperture using the edge segments, and further, the shutter blades are pivoted on the respective central points of the second pivot in the same direction as the one direction to close the aperture.

6. A lens shutter system comprising:
   shutter blades serving as members for opening and closing an opening through which light rays for photography pass, each shutter blade being pivoted on the central point of first pivot and being pivoted on the central point of second pivot, each shutter blade having an edge segment constituting the edge of an aperture through which the light rays pass, the edge segment being formed between the central point of the first pivot and the central point of the second pivot, the central point of the first pivot and the central point of the second pivot being arranged on the outward of the light rays for photography respectively so as to sandwich the light rays therebetween; and a drive member for applying a driving force to open and close the shutter blades, wherein the shutter blades are driven by the drive member, while the respective central points of the second pivot are being rotated about the optical axis in one direction, the shutter blades are pivoted on the respective central points of the first pivot in the same direction as the one direction to form the aperture using the edge segments, and while the respective central points of the first pivot are being rotated about the optical axis in the same direction as the one direction, the shutter blades are pivoted on the respective central points of the second pivot in the same direction as the one direction to close the aperture.

7. A lens shutter system comprising:

shutter blades each having an edge segment constituting the edge of an aperture through which light rays for photography pass, each shutter blade being pivoted on the central point of first pivot and being pivoted on the central point of second pivot, each edge segment being formed between the central point of the first pivot and the central point of the second pivot, the central point of the first pivot and the central point of the second pivot being arranged in each shutter blade so as to sandwich the light rays therebetween, the respective central points of the first pivot and the respective central points of the second pivot being rotated about the optical axis of the light rays;

a first rotation drive member for rotating the central points of the second pivot about the optical axis in one direction and simultaneously pivoting the shutter blades on the respective central points of the first pivot in the same direction as the one direction to form the aperture using the edge segments; and a second rotation drive member for rotating the central points of the first pivot about the optical axis in the same direction as the one direction and simultaneously pivoting the shutter blades on the respective central points of the second pivot in the same direction as the one direction to close the aperture.

* * * * *